US006572986B2

(12) United States Patent
Ogawa et al.

(10) Patent No.: US 6,572,986 B2

(45) Date of Patent: Jun. 3, 2003

(54) RADIATION IMAGE STORAGE PANEL AND PROCESS FOR PRODUCING THE SAME

(75) Inventors: Hiroshi Ogawa, Kaisei-machi (JP); Shinichiro Fukui, Kaisei-machi (JP); Yasuo Iwabuchi, Kaisei-machi (JP); Shigeo Hirano, Kaisei-machi (JP); Noriyuki Inoue, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/770,221

(22) Filed: Jan. 29, 2001

(65) Prior Publication Data

US 2001/0053461 A1 Dec. 20, 2001

(30) Foreign Application Priority Data

Jan. 28, 2000 (JP) ....................................... 2000-020339
Feb. 8, 2000 (JP) ....................................... 2000-030332
Mar. 9, 2000 (JP) ....................................... 2000-064749

(51) Int. Cl.[7] ............................ H01J 1/62; C09K 11/00

(52) U.S. Cl. .................... 428/690; 428/917; 252/483.1; 250/484.4; 427/157; 427/212; 427/370

(58) Field of Search ....................... 252/483.1; 428/690, 428/917, 423.1; 313/502; 250/483.1, 484.4, 487.1; 427/157, 212, 370

(56) References Cited

U.S. PATENT DOCUMENTS 4,205,116 A * 5/1980 Van Landeghem et al. . 428/409
4,239,968 A 12/1980 Kotera et al. ............ 250/327.1
4,666,774 A * 5/1987 Christini ...................... 428/330
5,153,078 A 10/1992 Kojima et al. .............. 428/690
5,482,813 A * 1/1996 Tadashi ....................... 430/139
5,743,977 A * 4/1998 Suzuki et al. ................. 156/67
5,972,590 A * 10/1999 Friour et al. ................ 430/583
6,162,553 A * 12/2000 Ercoli et al. ................ 428/690
6,262,424 B1 * 7/2001 Yanagita et al. ......... 250/483.1
6,368,397 B1 * 4/2002 Ichizawa et al. ......... 106/31.65

FOREIGN PATENT DOCUMENTS

CA 1 243 534 10/1988 .......... G01D/15/14
EP 0 931 647 A1 * 1/1998
JP 59-126299 7/1984 ............ G21K/4/00
JP 59-126300 7/1984 ............ G21K/4/00
JP 6-31908 4/1994 ............ G21K/4/00

OTHER PUBLICATIONS

Abstract 94031908, Based on patent JP 62209398.

* cited by examiner

*Primary Examiner*—Cynthia H. Kelly
*Assistant Examiner*—Dawn Garrett
(74) *Attorney, Agent, or Firm*—Sughrue Mion, PLLC

(57) ABSTRACT

A radiation image storage panel comprises at least a substrate and a phosphor layer overlaid upon the substrate. The phosphor layer contains a binder, a phosphor, and at least one kind of organic phosphorus compound represented by Formula (1):

$$(R)_nPO(OM)_{3-n} \quad (1)$$

in which R represents an alkyl group, an aryl group, or a heterocyclic group, which may be optionally substituted by a substituent;

M represents a hydrogen atom, an alkali metal, or —$N^+(R^1)_4$, where $R^1$ represents an alkyl group having at most two carbon atoms; and n represents an integral number of 1 or 2.

The radiation image storage panel exhibits enhanced dispersibility of phosphor particles and a high sensitivity and yields little noise.

20 Claims, No Drawings

RADIATION IMAGE STORAGE PANEL AND PROCESS FOR PRODUCING THE SAME

BACKGROUND OF THE INVENTION

1. Field of the Invention

This invention relates to a radiation image storage panel for use in a radiation image recording and reproducing techniques, in which phosphors are utilized. This invention also relates to a process for producing the radiation image storage panel.

2. Description of the Related Art

As techniques for obtaining radiation images for medical diagnosis and radiation images of various objects in a non-destructive mode and utilizing the radiation images for making medical diagnosis, flaw detecting inspections, and a like, radiography utilizing a combination of a silver halide photographic material (hereinbelow referred to simply as the photographic material) and an intensifying screen has heretofore been used in practice. With the radiography, radiation carrying image information of an object is irradiated to the intensifying screen, and a phosphor contained in the intensifying screen is excited by the radiation to emit near ultraviolet light or visible light. The emitted light impinges upon the photographic material, and a radiation image of the object is recorded on the photographic material The radiation image is utilized for making medical diagnosis, flaw detecting inspections, or the like. Specifically, the photographic material comprises a substrate and a silver halide emulsion layer, which is overlaid on one surface of the substrate, or silver halide emulsion layers, which are overlaid on opposite surfaces of the substrate. Also, an intensifying screen is brought into close contact with one surface of the photographic material, or intensifying screens are brought into close contact with opposite surfaces of the photographic material. The combination of the photographic material and at least one intensifying screen is exposed to radiation carrying image information of the object, and the radiation image is thereby formed.

In lieu of the conventional radiography described above, radiation image recording and reproducing techniques utilizing stimulable phosphors have heretofore been used in practice. The stimulable phosphors have the properties such that, when the stimulable phosphors having absorbed energy from radiation are exposed to an electromagnetic wave, such as visible light or infrared rays, the stimulable phosphors are stimulated to emit the energy as fluorescence. The radiation image recording and reproducing techniques are described in, for example, U.S. Pat. No. 4,239,968. The radiation image recording and reproducing techniques utilize a radiation image storage panel (referred to also as the stimulable phosphor sheet) provided with a stimulable phosphor. With the radiation image recording and reproducing techniques, the stimulable phosphor of the radiation image storage panel is caused to absorb radiation, which carries image information of an object or which has been radiated out from a sample, and thereafter the stimulable phosphor is exposed to an electromagnetic wave (stimulating rays), such as visible light or infrared rays, which causes the stimulable phosphor to produce the fluorescence (i.e., to emit light) in proportion to the amount of energy stored thereon during its exposure to the radiation. The produced fluorescence (the emitted light) is photoelectrically detected to obtain an electric signal. The electric signal is then processed, and the processed electric signal is utilized for reproducing a visible image of the object or the sample.

The radiation image recording and reproducing techniques have the advantages in that a radiation image containing a large amount of information can be obtained with a markedly lower dose of radiation than in the conventional radiography utilizing the radiation film and the intensifying screen. Therefore, the radiation image recording and reproducing techniques are efficient particularly for direct medical radiography, such as the X-ray image recording for medical diagnosis.

Basically, the radiation image storage panel utilized for the radiation image recording and reproducing techniques comprises a substrate and a stimulable phosphor layer overlaid on one surface of the substrate. In cases where the stimulable phosphor layer has self-supporting properties, the radiation image storage panel need not necessarily be provided with the substrate. Ordinarily, a transparent protective film is formed on the surface of the stimulable phosphor layer, which surface is opposite to the surface that stands facing the substrate. The transparent protective layer protects the stimulable phosphor layer from chemical deterioration or physical shocks.

The stimulable phosphor layer comprises a binder and stimulable phosphor particles dispersed in the binder. The stimulable phosphor has the properties such that, when the stimulable phosphor is caused to absorb radiation, such as X-rays, and is then exposed to the stimulating rays, the stimulable phosphor emits light in proportion to the amount of energy stored thereon during its exposure to the radiation. Therefore, when the radiation image storage panel is exposed to the radiation, which carries image information of an object or which has been radiated out from a sample, the stimulable phosphor layer of the radiation image storage panel absorbs the radiation in proportion to the dose of radiation, and a radiation image of the object or the sample is stored as an image of energy from the radiation on the radiation image storage panel. The radiation image storage panel is then exposed to the stimulating rays, and the image having been stored on the radiation image storage panel can be detected as the light emitted by the radiation image storage panel. The emitted light is detected photoelectrically to obtain an image signal, the image signal is processed, and the thus obtained processed image signal can then be utilized for reproducing the radiation image of the object or the sample as a visible image.

As described above, the radiation image recording and reproducing techniques are the advantageous image forming techniques. However, as in the cases of an intensifying screen employed in the conventional radiography, it is desired that the radiation image storage panel utilized for the radiation image recording and reproducing techniques has a high sensitivity and can yield an image of good image quality (with respect to sharpness, graininess, and the like).

Basically, the sensitivity of the radiation image storage panel depends upon a total light emission intensity of the stimulable phosphor, which is contained in the radiation image storage panel. The total light emission intensity depends upon light emission luminance of the stimulable phosphor itself and the content of the stimulable phosphor in the stimulable phosphor layer. In cases where the content of the stimulable phosphor in the stimulable phosphor layer is high, a high absorptivity is capable of being obtained with respect to the radiation, such as the X-rays. Therefore, in cases where the content of the stimulable phosphor in the stimulable phosphor layer is high, a high sensitivity is capable of being obtained, and the image quality (in particular, with respect to the graininess) is capable of being enhanced. In cases where the content of the stimulable phosphor in the stimulable phosphor layer is kept at a predetermined value, if the stimulable phosphor particles are packed closely in the stimulable phosphor layer, the thickness of the stimulable phosphor layer can be set to be thin. Therefore, in such cases, spreading of the stimulating rays due to scattering in the stimulable phosphor layer is capable of being minimized, and an image having a high sharpness is capable of being obtained.

As radiation image storage panels provided with a stimulable phosphor layer, in which a stimulable phosphor is packed closely, and processes for producing the radiation image storage panels, the applicant proposed radiation image storage panels, in which a void content in the stimulable phosphor layer has been reduced by performing compression processing on the stimulable phosphor layer, and processes for producing the radiation image storage panels. The proposed radiation image storage panels and the proposed processes for producing the radiation image storage panels are disclosed in, for example, Japanese Unexamined Patent Publication Nos. 59(1984)-126299 and 59(1984)-126300.

With the proposed radiation image storage panels, the stimulable phosphor layer is subjected to the compression processing, and the density of the stimulable phosphor in the stimulable phosphor layer is set at a higher value than in conventional radiation image storage panels. As a result, an image having a high sharpness is capable of being obtained with the proposed radiation image storage panels. However, the proposed radiation image storage panels have the problems in that the stimulable phosphor is partially broken due to the compression processing, and the sensitivity becomes low. Therefore, research has heretofore been conducted to employ techniques for enhancing dispersibility of stimulable phosphor particles and minimizing the void content in the stimulable phosphor layer before the compression processing is performed.

As one of the techniques for improving the state of dispersion of the stimulable phosphor, a technique, in which a dispersing process is performed for a long time when a coating composition containing the stimulable phosphor is to be prepared. However, the technique for performing the dispersing process for a long time has the problems in that a considerable shearing force is exerted on the stimulable phosphor, and the characteristics of the stimulable phosphor are often lost. Also, the technique for performing the dispersing process for a long time has the problems in that a long time is required to produce the radiation image storage panel, and the working efficiency cannot be kept high.

Accordingly, research has heretofore been conducted to employ techniques for efficiently dispersing a stimulable phosphor such that a marked alteration may not be made on ordinary processes for producing a radiation image storage panel. As one of such techniques, a technique for performing surface treatment on a stimulable phosphor and with a surface treatment agent, such as a silane coupling agent has been proposed in, for example, Japanese Patent Publication No. 6(1994)-31908. Also, as another example of such techniques, a technique for treating a stimulable phosphor with a titanate type of coupling agent has been proposed in, for example, Japanese Patent Publication No. 8(1996) - 540363. However, for the reasons described below, the proposed techniques are not satisfactory as a technique for obtaining a radiation image storage panel having a high sensitivity by enhancing the dispersibility of the stimulable phosphor and the packing rate of the stimulable phosphor. Specifically, ordinarily, the stability of the dispersed state of the stimulable phosphor particles, which have been subjected to surface treatment with the coupling agents described above, is enhanced in the state of the coating composition. However, it often occurs that the compatibility of the stimulable phosphor particles, which have been subjected to surface treatment with the coupling agents described above, with respect to resin constituents becomes low. Therefore, it often occurs that the ultimate state of dispersion of the stimulable phosphor in the stimulable phosphor layer cannot be sufficiently enhanced.

SUMMARY OF THE INVENTION

The primary object of the present invention is to provide a radiation image storage panel, in which dispersibility of phosphor particles has been enhanced and which has a high sensitivity and yields little noise.

Another object of the present invention is to provide a process for producing a radiation image storage panel, wherein a packing rate of a phosphor in a phosphor layer is capable of being enhanced such that a decrease in sensitivity of the phosphor due to compression processing is minimized.

The present invention provides a first radiation image storage panel, comprising at least a substrate and a phosphor layer overlaid upon the substrate, wherein the phosphor layer contains a binder, a phosphor, and at least one kind of organic phosphorus compound represented by Formula (1):

$$(R)_nPO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.

The term "radiation image storage panel" as used herein means both the radiation image storage panel containing a stimulable phosphor, which radiation image storage panel is employed for radiation image recording and reproducing techniques utilizing a stimulable phosphor, and the intensifying screen utilized for the conventional radiography.

In the first radiation image storage panel in accordance with the present invention, R in Formula (1) representing the organic phosphorus compound should preferably represent an aryl group or an aryl group substituted by an alkyl group having one to four carbon atoms.

Also, in the first radiation image storage panel in accordance with the present invention, the binder should preferably be a thermoplastic elastomer having a softening temperature or a melting temperature, which falls within the range of 30° C. to 150° C. The binder should more preferably be a polyurethane resin.

The present invention also provides a first process for producing a radiation image storage panel, which radiation image storage panel comprises at least a substrate and a phosphor layer overlaid upon the substrate, the phosphor layer containing a binder, a phosphor, and at least one kind of organic phosphorus compound represented by Formula (1):

$$(R)_nPO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting the phosphor, the organic phosphorus compound, and the binder to dispersing processing in order to prepare a coating composition, and ii) performing application of the coating composition in order to form the phosphor layer.

The first process for producing a radiation image storage panel in accordance with the present invention should preferably be modified such that particles of the phosphor are subjected to surface treatment with the organic phosphorus compound, the surface-treated phosphor particles and the binder are subjected to dispersing processing in order to prepare a coating composition, and application of the coating composition is performed in order to form the phosphor layer.

Also, the first process for producing a radiation image storage panel in accordance with the present invention should preferably be modified such that the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

(In cases where the phosphor layer is to be overlaid upon the substrate, the phosphor layer having been formed in a sheet-like shape is placed on the substrate and adhered to the substrate. Therefore, in this specification, the phosphor layer will often be referred to as a phosphor sheet.)

The present invention further provides a second radiation image storage panel, comprising at least a substrate and a phosphor layer overlaid upon the substrate, wherein the phosphor layer contains a binder, a phosphor, and at least one kind of organic phosphorus compound represented by either one of Formula (2) and Formula (3):

(2)

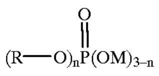

$$(R'—O)_nP(OM)_{3-n} \quad (3)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.

In the second radiation image storage panel in accordance with the present invention, R' in each of Formula (2) and Formula (3) representing the organic phosphorus compound should preferably represent an aryl group.

Also, in the first radiation image storage panel in accordance with the present invention, the binder should preferably be a thermoplastic elastomer having a softening temperature or a melting temperature, which falls within the range of 30° C. to 150° C. The binder should more preferably be a polyurethane resin.

The present invention still further provides a second process for producing a radiation image storage panel, which radiation image storage panel comprises at least a substrate and a phosphor layer overlaid upon the substrate, the phosphor layer containing a binder, a phosphor, and at least one kind of organic phosphorus compound represented by either one of Formula (2) and Formula (3):

(2)

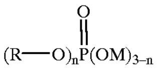

$$(R'—O)_nP(OM)_{3-n} \quad (2)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting the phosphor, the organic phosphorus compound, and the binder to dispersing processing in order to prepare a coating composition, and ii) performing application of the coating composition in order to form the phosphor layer.

The second process for producing a radiation image storage panel in accordance with the present invention should preferably be modified such that particles of the phosphor are subjected to surface treatment with the organic phosphorus compound, the surface-treated phosphor particles and the binder are subjected to dispersing processing in order to prepare a coating composition, and application of the coating composition is performed in order to form the phosphor layer.

Also, the second process for producing a radiation image storage panel in accordance with the present invention should preferably be modified such that the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

The present invention also provides a third radiation image storage panel, comprising at least a substrate and a phosphor layer overlaid upon the substrate, wherein the phosphor layer contains a binder, a phosphor, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms.

In the third radiation image storage panel in accordance with the present invention, the binder should preferably be a thermoplastic elastomer having a softening temperature or a melting temperature, which falls within the range of 30° C. to 150° C. The binder should more preferably be a polyurethane resin.

The present invention further provides a third process for producing a radiation image storage panel, which radiation image storage panel comprises at least a substrate and a phosphor layer overlaid upon the substrate, the phosphor layer containing a binder, a phosphor, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms;

the process comprising the steps of:

i) subjecting the phosphor, the aralkyl phosphonic acid, and the binder to dispersing processing in order to prepare a coating composition, and ii) performing application of the coating composition in order to form the phosphor layer.

The third process for producing a radiation image storage panel in accordance with the present invention should preferably be modified such that particles of the phosphor are subjected to surface treatment with the aralkyl phosphonic acid, the surface-treated phosphor particles and the binder are subjected to dispersing processing in order to prepare a coating composition, and application of the coating composition is performed in order to form the phosphor layer.

Also, the third process for producing a radiation image storage panel in accordance with the present invention should preferably be modified such that the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

With the first radiation image storage panel in accordance with the present invention, the phosphor layer contains at least one kind of organic phosphorus compound represented by Formula (1):

$$(R)_nPO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.Therefore, as described below, the advantages over the techniques, wherein a coupling agent is employed as a surface treatment agent for the phosphor particles, are capable of being obtained. Specifically, with the first radiation image storage panel in accordance with the present invention, the organic phosphorus compound is firmly adsorbed to the surfaces of the phosphor particles and is capable of forming organic monomolecular films on the surfaces of the phosphor particles. Therefore, the phosphor particles are released from agglomeration. Accordingly, the phosphor particles are capable of being uniformly dispersed in the binder, and good adhesion between the phosphor particles, which are the inorganic material, and the binder, which is the organic material, is capable of being obtained.

Also, with the first radiation image storage panel in accordance with the present invention, wherein the surfaces of the phosphor particles are treated with the organic phosphorus compound, the phosphor particles are capable of being dispersed uniformly in the phosphor layer, the affinity between the surfaces of the phosphor particles and the binder resin is capable of being enhanced, and the packing rate of the phosphor in the phosphor layer is capable of being enhanced. Therefore, the problems are capable of being prevented from occurring in that the phosphor particles break one another due to compression processing in the process for producing a radiation image storage panel.

Further, the organic phosphorus compound employed in the phosphor layer has a strong mutual action. Therefore, after the phosphor layer has been formed, the organic phosphorus compound does not undergo desorption from the surfaces of the phosphor particles. As a result, durability of the radiation image storage panel against movement operations is capable of enhanced markedly. Furthermore, since the organic phosphorus compound has a lower susceptibility to water than other organic acid compounds, such as sulfonic acid, a radiation image storage panel having a high water resistance and good durability is capable of being obtained.

With the first process for producing a radiation image storage panel in accordance with the present invention, the phosphor layer is formed by subjecting the phosphor, the organic phosphorus compound, and the binder to dispersing processing in order to prepare the coating composition, and performing the application of the coating composition. Alternatively, with the first process for producing a radiation image storage panel in accordance with the present invention, the phosphor layer may be formed by subjecting the particles of the phosphor to surface treatment with the organic phosphorus compound, subjecting the surface-treated phosphor particles and the binder to the dispersing processing in order to prepare the coating composition, and performing the application of the coating composition. Therefore, the phosphor particles are capable of being released from agglomeration, and the organic phosphorus compound is capable of being firmly adsorbed to the surfaces of the phosphor particles. Accordingly, the phosphor particles are capable of being dispersed uniformly in the phosphor layer.

With the first process for producing a radiation image storage panel in accordance with the present invention, the phosphor layer, which has been formed with the dispersing processing and the application of the coating composition, may be located on the substrate, and the phosphor layer having been located on the substrate may be compressed at a temperature equal to at least the softening temperature or the melting temperature of the binder, the phosphor layer and the substrate being thereby adhered to each other. In such cases, the phosphor is capable of being more reliably prevented from being broken.

Specifically, during the compression processing, the phosphor particles having been dispersed in the binder, which is set at the temperature equal to at least the softening temperature or the melting temperature of the binder, receive a pressure in a state in which the phosphor particles have a certain degree of movement flexibility. Therefore, under the applied pressure, the phosphor particles are capable of being orientated easily. Also, the phosphor sheet is located on the substrate without being secured to the substrate, a pressure is applied to the phosphor sheet, and the phosphor sheet is thereby adhered to the substrate while the phosphor sheet is being compressed. Therefore, even if the phosphor sheet is subjected to a pressure of a level, such that the phosphor particles will be broken if the phosphor sheet is secured to the substrate, the phosphor sheet is capable of being processed such that the phosphor particles are orientated, and the phosphor sheet is capable of being extended into a thin sheet.

With the second radiation image storage panel in accordance with the present invention, the phosphor layer contains at least one kind of organic phosphorus compound represented by either one of Formula (2) and Formula (3):

(2)

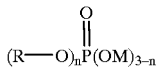

$$(R'—O)_nP(OM)_{3-n} \quad (3)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2. Therefore, the same effects as those with the first radiation image storage panel in accordance with the present invention are capable of being obtained.

With the second process for producing a radiation image storage panel in accordance with the present invention, the phosphor layer is formed by subjecting the phosphor, the organic phosphorus compound, and the binder to dispersing processing in order to prepare the coating composition, and performing the application of the coating composition. Alternatively, with the second process for producing a radiation image storage panel in accordance with the present invention, the phosphor layer may be formed by subjecting the particles of the phosphor to surface treatment with the organic phosphorus compound, subjecting the surface-treated phosphor particles and the binder to the dispersing processing in order to prepare the coating composition, and performing the application of the coating composition. Therefore, the phosphor particles are capable of being released from agglomeration, and the organic phosphorus compound is capable of being firmly adsorbed to the surfaces of the phosphor particles. Accordingly, the phosphor particles are capable of being dispersed uniformly in the phosphor layer.

With the second process for producing a radiation image storage panel in accordance with the present invention, as in the first process for producing a radiation image storage panel in accordance with the present invention, the phosphor layer, which has been formed with the dispersing processing and the application of the coating composition, may be located on the substrate, and the phosphor layer having been located on the substrate may be compressed at a temperature equal to at least the softening temperature or the melting temperature of the binder, the phosphor layer and the substrate being thereby adhered to each other. In such cases, the phosphor is capable of being more reliably prevented from being broken.

With the third radiation image storage panel in accordance with the present invention, the phosphor layer contains at least one kind of aralkyl phosphonic acid represented by Formula (4):

$$((Ar)_m—R''—)_nPO(OM')_{3-n} \quad (4)$$

in which Ar represents an aryl group;

R'' represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms.

Therefore, as described below, the advantages over the techniques, wherein a coupling agent is employed as a surface treatment agent for the phosphor particles, are capable of being obtained. Specifically, with the third radiation image storage panel in accordance with the present invention, the aralkyl phosphonic acid is firmly adsorbed to the surfaces of the phosphor particles and is capable of forming organic monomolecular films on the surfaces of the phosphor particles. Therefore, the phosphor particles are released from agglomeration. Accordingly, the phosphor particles are capable of being uniformly dispersed in the binder, and good adhesion between the phosphor particles, which are the inorganic material, and the binder, which is the organic material, is capable of being obtained.

Also, with the third radiation image storage panel in accordance with the present invention, wherein the surfaces of the phosphor particles are treated with the aralkyl phosphonic acid, the phosphor particles are capable of being dispersed uniformly in the phosphor layer, the affinity between the surfaces of the phosphor particles and the binder resin is capable of being enhanced, and the packing rate of the phosphor in the phosphor layer is capable of being enhanced. Therefore, the problems are capable of being prevented from occurring in that the phosphor particles break one another due to compression processing in the process for producing a radiation image storage panel.

Further, the aralkyl phosphonic acid employed in the phosphor layer has a strong mutual action. Therefore, after the phosphor layer has been formed, the organic phosphorus compound does not undergo desorption from the surfaces of the phosphor particles. As a result, durability of the radiation image storage panel against movement operations is capable of enhanced markedly. Furthermore, since the aralkyl phosphonic acid has a lower susceptibility to water than other organic acid compounds, such as sulfonic acid, a radiation image storage panel having a high water resistance and good durability is capable of being obtained.

With the third process for producing a radiation image storage panel in accordance with the present invention, the phosphor layer is formed by subjecting the phosphor, the aralkyl phosphonic acid, and the binder to dispersing processing in order to prepare the coating composition, and performing the application of the coating composition. Alternatively, with the third process for producing a radiation image storage panel in accordance with the present invention, the phosphor layer may be formed by subjecting the particles of the phosphor to surface treatment with the aralkyl phosphonic acid, subjecting the surface-treated phosphor particles and the binder to the dispersing processing in order to prepare the coating composition, and performing the application of the coating composition. Therefore, the phosphor particles are capable of being released from agglomeration, and the aralkyl phosphonic acid is capable of being firmly adsorbed to the surfaces of the phosphor particles. Accordingly, the phosphor particles are capable of being dispersed uniformly in the phosphor layer.

With the third process for producing a radiation image storage panel in accordance with the present invention, as in the first and second processes for producing a radiation image storage panel in accordance with the present invention, the phosphor layer, which has been formed with the dispersing processing and the application of the coating composition, may be located on the substrate, and the phosphor layer having been located on the substrate may be compressed at a temperature equal to at least the softening temperature or the melting temperature of the binder, the phosphor layer and the substrate being thereby adhered to each other. In such cases, the phosphor is capable of being more reliably prevented from being broken.

DETAILED DESCRIPTION OF THE INVENTION

The radiation image storage panels in accordance with the present invention will hereinbelow be described in detail. Firstly, phosphors capable of being employed in the first, second, and third radiation image storage panels in accordance with the present invention will be described hereinbelow.

As the phosphor, a stimulable phosphor may be employed. The stimulable phosphor has the properties such that, when the stimulable phosphor is caused to absorb radiation and is then exposed to stimulating rays, the stimulable phosphor emits light in proportion to the amount of energy stored thereon during its exposure to the radiation. From the practical aspect, the stimulable phosphor should preferably have the characteristics such that, when the stimulable phosphor is exposed to the stimulating rays having wavelengths falling within the range of 400 nm to 900 nm, the stimulable phosphor emits light having wavelengths falling within the range of 300 nm to 500 nm. Examples of the stimulable phosphors, which may be employed in the radiation image storage panels in accordance with the present invention, include the following:

a phosphor represented by the formula $BaSO_4$:AX, as described in Japanese Unexamined Patent Publication No. 48 (1973)-80487, a phosphor represented by the formula $SrSO_4$:AX, as described in Japanese Unexamined Patent Publication No. 48 (1973)-80489, a phosphor represented by the formula $Li_2B_4O_7$:Cu ,Ag, as described in Japanese Unexamined Patent Publication No. 53(1978)-39277, a phosphor represented by the formula $Li_2O'(B_2O_2)_x$:Cu; or $Li_2O'(B_2O_2)_x$:Cu,Ag, as described in Japanese Unexamined Patent Publication No. 54(1979)-47883, a phosphor represented by the formula SrS:Ce,Sm; SrS:Eu,Sm; $ThO_2$:Er; or $La_2O_2S$:Eu,Sm, as described in U.S. Pat. No. 3,859,527, a phosphor represented by the formula ZnS:Cu,Pb; $BaO'xAl_2O_3$:Eu wherein $0.8 \leqq x \leqq 10$; $M^{II}O'xSiO_2$:A wherein $M^{II}$ is Mg, Ca, Sr, Zn, Cd, or Ba, A is Ce, Tb, Eu, Tm, Pb, Tl, Bi, or Mn, and x is a number satisfying $0.5 \leqq x \leqq 2.5$; or LnOX:xA wherein Ln is at least one of La, Y, Gd, and Lu, X is at least one of Cl and Br, A is at least one of Ce and Tb, x is a number satisfying $0<x<0.1$, as disclosed in U.S. Pat. No. 4,236,078, a phosphor represented by the formula $(Ba_{1-x-y}, Mg_x, Ca_y)FX:aEu^{2+}$ wherein X is at least one of Cl and Br, x and y are numbers satisfying $0<x+y \leqq 0.6$ and $xy \neq 0$, and a is a number satisfying $10^{-6} \leqq a \leqq 5 \times 10^{-2}$, as disclosed in DE-OS No. 2,928,245, a phosphor represented by the formula $(Ba_{1-x}, M^{2+}{}_x)$ FX:yA wherein $M^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leqq x \leqq 0.6$, and y is a number satisfying $0 \leqq y \leqq 0.2$, as disclosed in U.S. Pat. No. 4,239,968, a phosphor represented by the formula BaFX:xCe'yA, as described in Japanese Unexamined Patent Publication No. 55(1980)-843897, a phosphor represented by the formula $M^{II}FX'xA:yLn$ wherein $M^{II}$ is at least one of Ba, Ca, Sr, Mg, Zn, and Cd, A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leqq x \leqq 0.5$, and y is a number satisfying $0<y \leqq 0.2$, as described in Japanese Unexamined Patent Publication No. 55(1980)-160078, a phosphor represented by the formula $(Ba_{1-x}, M^{II}{}_x)F_2'aBaX_2:yEu, zA$ wherein $M^{II}$ is at least one of beryllium, magnesium, calcium, strontium, zinc, and cadmium, X is at least one of chlorine, bromine, and iodine, A is at least one of zirconium and scandium, a is a number satisfying $0.5 \leqq a \leqq 1.25$, x is a number satisfying $0 \leqq x \leqq 1$, y is a number satisfying $10^{-6} \leqq y \leqq 2 \times 10^{-1}$, and z is a number satisfying $0<z \leqq 10^{-2}$, as described in Japanese Unexamined Patent Publication No. 56(1981)-116777, a phosphor represented by the formula $(Ba_{1-x},M^{II}{}_x)F_2 \cdot aBaX_2:yEu, zB$ wherein $M^{II}$ is at least one of beryllium, magnesium, calcium, strontium, zinc, and cadmium, X is at least one of chlorine, bromine, and iodine, a is a number satisfying $0.5 \leqq a \leqq 1.25$, x is a number satisfying $0 \leqq x \leqq 1$, y is a number satisfying $10^{-6} \leqq y \leqq 2 \times 10^{-1}$, and z is a number satisfying $0<z \leqq 10^{-2}$, as described in Japanese Unexamined Patent Publication No. 57(1982)-23673, a phosphor represented by the formula $(Ba_{1-x}, M^{II}{}_x)F_2 \cdot aBaX_2:yEu, zA$ wherein $M^{II}$ is at least one of beryllium, magnesium, calcium, strontium, zinc, and cadmium, X is at least one of chlorine, bromine, and iodine, A is at least one of arsenic and silicon, a is a number satisfying $0.5 \leqq a \leqq 1.25$, x is a number satisfying $0 \leqq x \leqq 1$, y is a number satisfying $10^{-6} \leqq y \leqq 2 \times 10^{-1}$, and z is a number satisfying $0<z \leqq 5 \times 10^{-1}$, as described in Japanese Unexamined Patent Publication No. 57(1982)-23675, a phosphor represented by the formula $M^{III}OX:xCe$ wherein $M^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying 0<x<0.1, as described in Japanese Unexamined Patent Publication No. 58(1983)-69281, a phosphor represented by the formula $Ba_{1-x}M_{x/2}L_{x/2}FX{:}yEu^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leqq x \leqq 0.5$, and y is a number satisfying $0<y \leqq 0.1$, as described in Japanese Unexamined Patent Publication No. 58(1983)-206678, a phosphor represented by the formula $BaFX \cdot xA{:}yEu^{2+}$, wherein X is at least one halogen selected from the group consisting of Cl, Br, and I, A is a calcination product of a tetrafluoro boric acid compound, x is a number satisfying $10^{-6} \leqq x \leqq 0.1$, and y is a number satisfying $0<y \leqq 0.1$, as described in Japanese Unexamined Patent Publication No. 59(1984)-27980, a phosphor represented by the formula $xM_3(PO_4)_2 \cdot NX_2{:}yA$; $M_3(PO_4)_2{:}yA$; $nReX_3 \cdot mAX'_2{:}xEu$; $nReX_3 \cdot mAX'_2{:}xEu, ySm$; or $M^IX \cdot aM^{II}X'_2 \cdot bM^{III}X''_3{:}cA$, as described in Japanese Unexamined Patent Publication No. 59(1984)-38278, a phosphor represented by the formula $BaFX \cdot xA{:}yEu^{2+}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6} \leqq x \leqq 0.1$ and y is a number satisfying $0<y \leqq 0.1$, as described in Japanese Unexamined Patent Publication No. 59(1984) -47289, a phosphor represented by the formula $BaFX \cdot xNaX'{:}aEu^{2+}$ wherein each of X and X' is at least one of Cl, Br, and I, x is a number satisfying $0<x \leqq 2$, and a is a number satisfying $0<a \leqq 0.2$, as described in Japanese Unexamined Patent Publication No. 59(1984)-56479, a phosphor represented by the formula $M^{II}FX \cdot xNaX'{:}yEu^{2+}{:}zA$ wherein $M^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x \leqq 2$, y is a number satisfying $0<y \leqq 0.2$, and z is a number satisfying $0<z \leqq 10^{-2}$, as described in Japanese Unexamined Patent Publication No. 59(1984)-56480, a phosphor represented by the formula $M^{II}FX \cdot aM^IX' \cdot bM'^{II}X''_2 \cdot cM^{III}X'''_3 \cdot xA{:}\ yEu^{2+}$ wherein $M^{II}$ is at least one alkaline earth metal selected from the group consisting of Ba, Sr, and Ca, $M^I$ is at least one alkali metal selected from the group consisting of Li, Na, K, Rb, and Cs, $M'^{II}$ is at least one bivalent metal selected from the group consisting of Be and Mg, $M^{III}$ is at least one trivalent metal selected from the group consisting of Al, Ga, In, and Tl, A is a metal oxide, X is at least one halogen selected from the group consisting of Cl, Br, and I, each of X', X'', and X''' is at least one halogen selected from the group consisting of F, Cl, Br, and I, a is a number satisfying $0 \leqq a \leqq 2$, b is a number satisfying $0 \leqq b \leqq 10^{-2}$, c is a number satisfying $0 \leqq c \leqq 10^{-2}$, and $a+b+c \geqq 10^{-6}$, x is a number satisfying $0<x \leqq 0.5$, and y is a number satisfying $0<y \leqq 0.2$, as described in Japanese Unexamined Patent Publication No. 59(1984)-75200, a stimulable phosphor represented by the formula $M^{II}X_2 \cdot aM^{II}X'_2{:}xEu^{2+}$ wherein $M^{II}$ is at least one alkaline earth metal selected from the group consisting of Ba, Sr, and Ca, each of X and X' is at least one halogen selected from the group consisting of Cl, Br, and I, and $X \neq X'$, a is a number satisfying $0.1 \leqq a \leqq 10.0$, and x is a number satisfying $0<x \leqq 0.2$, as described in Japanese Unexamined Patent Publication No. 60(1985)-84381, a stimulable phosphor represented by the formula $M^{II}FX \cdot aM^IX'{:}xEu^{2+}$ wherein $M^{II}$ is at least one alkaline earth metal selected from the group consisting of Ba, Sr, and Ca, $M^I$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0 \leqq a \leqq 4.0$, and x is a number satisfying $0<x \leqq 0.2$, as described in Japanese Unexamined Patent Publication No. 60(1985)-101173, and a stimulable phosphor represented by the formula $M^IX{:}xBi$ wherein $M^I$ is at least one alkali metal selected from the group consisting of Rb and cs, X is at least one halogen selected from the group consisting of Cl, Br, and I, and x is a number falling within the range of $0<x \leqq 0.2$, as described in Japanese Unexamined Patent Publication No. 62(1987)-25189.

The stimulable phosphor represented by the formula $M^{II}X_2 \cdot aM^{II}X'_2{:}xEu^{2+}$, which is described in Japanese Unexamined Patent Publication No. 60(1985)-84381, may contain the additives described below in the below-mentioned proportions per mol of $M^{II}X_2 \cdot aM^{II}X'_2$:

$bM^IX''$ wherein $M^I$ is at least one alkali metal selected from the group consisting of Rb and Cs, X'' is at least one halogen selected from the group consisting of F, Cl, Br, and I, and b is a number satisfying $0<b \leqq 10.0$, as described in Japanese Unexamined Patent Publication No. 60(1985) -166379, $bKX'' \cdot cMgX_2 \cdot dM^{III}X'_3$ wherein $M^{III}$ is at least one trivalent metal selected from the group consisting of Sc, Y, La, Gd, and Lu, each of X'', X, and X' is at least one halogen selected from the group consisting of F, Cl, Br, and I, b is a number satisfying $0 \leqq b \leqq 2.0$, c is a number satisfying $0 \leqq c \leqq 2.0$, d is a number satisfying $0 \leqq d \leqq 2.0$, and $2 \times 10^{-5} \leqq b+c+d$, as described in Japanese Unexamined Patent Publication No. 60(1985) -221483, yB wherein y is a number satisfying $2 \times 10^{-4} \leqq y \leqq 2 \times 10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4} \leqq b \leqq 2 \times 10^{-1}$, as described in Japanese Unexamined Patent Publication No. 60(1985)-228593, bSiO wherein b is a number satisfying $0<b \leqq 3 \times 10^{-2}$ as described in Japanese Unexamined Patent Publication No. 61(1986)-120883, $bSnX''_2$ wherein X'' is at least one halogen selected from the group consisting of F, Cl, Br, and I, and b is a number satisfying $0<b \leqq 10^{-3}$, as described in Japanese Unexamined Patent Publication No. 61(1986)-120885, $bCsX''\cdot cSnX_2$ wherein each of X" and X is at least one halogen selected from the group consisting of F, Cl, Br, and I, b is a number satisfying $0<b\leqq 10.0$, and c is a number satisfying $10^{-6}\leqq c\leqq 2\times 10^{-2}$, as described in Japanese Unexamined Patent Publication No. 61(1986)-235486, and $bCsX''\cdot yLn^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b\leqq 10.0$, and y is a number satisfying $10^{-6}\leqq y\leqq 1.8\times 10^{-1}$, as described in Japanese Unexamined Patent Publication No. 61(1986)-235487.

Further, it is possible to employ a rare earth element-activated alkaline earth metal fluorohalide type of stimulable phosphor represented by Formula (I) acting as a fundamental composition formula:

$$(Ba_{1-a}, M^{II}_{a})\ FX{:}zLn \qquad (I)$$

in which $M^{II}$ is at least one alkaline earth metal selected from the group consisting of Sr and Ca, Ln is at least one rare earth element selected from the group consisting of Ce, Pr, Sm, Eu, Tb, Dy, Ho, Nd, Er, Tm, and Yb, X is at least one halogen selected from the group consisting of Cl, Br, and I, a is a number satisfying $0\leqq a<1$, and z is a number satisfying $0\leqq z<0.2$. In Formula (I), a should preferably be a number of at most 0.5. Also, Ln should preferably be Eu or Ce. Formula (I) does not represent that the ratio F:X is stoichiometrically such that F:X=1:1, and represents that the composition is a compound having a PbFCl type of crystal structure represented by $(Ba_{1-a}, M^{II}_{a})FX$. In general, a state of a BaFX crystal, in which a large number of $F^{+}(X^{-})$ center points, which are the vacancies of X-ions, have been formed, is preferable for enhancing the light emission efficiency with respect to light having wavelengths falling within the range of 600 nm to 700 nm. In such cases, F will be in slight excess of X.

Though not defined in Formula (I) , when necessary, additives described below may be added to the stimulable phosphor represented by Formula (I):

$$bA,\ wN^{I},\ xN^{II},\ yN^{III}$$

In the additives, $N^{I}$ represents at least one alkali metal compound selected from the group consisting of compounds of Li, Na, K, Rb, and Cs, $N^{II}$ represents at least one alkaline earth metal compound selected from the group consisting of compounds of Mg and Be, and $N^{III}$ represents at least one trivalent metal compound selected from the group consisting of compounds of Al, Ga, In, Tl, Sc, Y, La, Gd, and Lu. As the metal compounds, halides as described in Japanese Unexamined Patent Publication No. 59(1984)-75200 should preferably be employed. However, the metal compounds are not limited to the halides. A represents a metal oxide, such as $Al_2O_3$, $SiO_2$, or $ZrO_2$. In order for BaFx particles to be prevented from being sintered together, the metal oxide should preferably take on the form of ultrafine particles such that the mean particle diameter of primary particles is at most 0.1 $\mu$m, and the metal oxide should preferably have a low reactivity with respect to $(Ba_{1-a}, M^{II}_{a})FX$. In particular, the metal oxide should preferably be $Al_2O_3$. Also, b, w, x, and y represent the amounts of the compounds added per mol of $(Ba_{1-a}, M^{II}_{a})$ FX and are numbers respectively satisfying $0\leqq b\leqq 0.5$, $0\leqq w\leqq 2$, $0\leqq x\leqq 0.3$, and $0\leqq y\leqq 0.3$. As for an additive, whose weight decreases due to calcination and subsequent washing processing, the number representing the amount of the compound added does not represent the element ratio in a finally obtained composition. Certain additives will remain as the added compounds in the finally obtained composition, and certain additives will react with BaFX or will be taken into BaFX.

Further, when necessary, compounds described below may be employed as the additives:

Zn and Cd compounds, as described in Japanese Unexamined Patent Publication No. 55(1980)-12145, metal oxides $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$, and $ThO_2$, as described in Japanese Unexamined Patent Publication No. 55(1980) -160078, Zr and Sc compounds, as described in Japanese Unexamined Patent Publication No. 56(1981)-116777, B compounds, as described in Japanese Unexamined Patent Publication No. 57(1982)-23673, As and Si compounds, as described in Japanese Unexamined Patent Publication No. 57(1982)-23675, tetrafluoro boric acid compounds, as described in Japanese Unexamined Patent Publication No. 59(1984)-27980, hexafluoro compounds constituted of monovalent or bivalent salts of hexafluoro silicic acid, hexafluoro titanic acid, or hexafluoro zirconic acid, as described in Japanese Unexamined Patent Publication No. 59(1984)-47289, and compounds of transition metals, such as V, Cr, Mn, Fe, Co, and Ni, as described in Japanese Unexamined Patent Publication No. 59(1984)-56480.

However, the rare earth element-activated alkaline earth-metal fluorohalide type of stimulable phosphor, which may be employed in the radiation image storage panels in accordance with the present invention, is not limited to the phosphors containing the additives described above and may be selected from various stimulable phosphors, which basically contain the composition regarded as the rare earth element-activated alkaline earthmetal fluorohalide type of stimulable phosphor.

Ordinarily, the rare earth element-activated alkaline earth metal fluorohalide type of stimulable phosphor represented by Formula (I) acting as the fundamental composition formula have a particle aspect ratio falling within the range of 1.0 to 5.0. The rare earth element-activated alkaline earth metal fluorohalide type of stimulable phosphor, which may be employed in the radiation image storage panels in accordance with the present invention, should preferably have a particle aspect ratio falling within the range of 1.0 to 2.0 (and should more preferably have a particle aspect ratio falling within the range of 1.0 to 1.5), should preferably have a particle size median diameter (Dm) falling within the range of 1 $\mu$m to 10 $\mu$m (and should more preferably have a particle size median diameter (Dm) falling within the range of 2 $\mu$m to 7 $\mu$m), and should preferably have a value $\sigma$/Dm (where $\sigma$ represents the standard deviation of the particle size distribution) of at most 50% (and should more preferably have a value $\sigma$/Dm of at most 40%). The shape of the particles may be a rectangular parallelepiped form, a regular hexahedral form, a regular octahedral form, one of intermediate polyhedral forms, a tetradecahedral form, or the like. The shape of the particles should preferably be a tetradecahedral form. However, the shape of the particles may be one of various shapes other than the tetradecahedral form, which satisfy the aforesaid requirements with respect to the particle aspect ratio, the particle size, and the particle size distribution.

Of the above-enumerated stimulable phosphors, the bivalent europium activated alkaline earth metal halide phosphor and the cerium activated rare earth element oxyhalide phosphor exhibit light emission with a high luminance and therefore are particularly preferable. However, the stimulable phosphor employed in the radiation image storage panels in accordance with the present invention is not limited to the phosphors enumerated above and may be one of various other phosphors, which have the properties such that, when the phosphors are caused to absorb radiation and are then exposed to stimulating rays, the phosphors emit light in proportion to the amount of energy stored thereon during exposure to the radiation.

Of the phosphors enumerated above, the phosphor particles, whose surfaces have been partially oxidized through calcination or cooling in a weakly oxidizing atmosphere at an intermediate stage or a final stage of a calcination processing, exhibit good erasing characteristics and therefore are particularly preferable.

In cases where the first, second, and third radiation image storage panels in accordance with the present invention are utilized as the intensifying screens, the phosphors listed below may be employed appropriately:

a tungstate type of phosphor, such as $caWo_4$, $MgWO_4$, or $CaWO_4$:Pb, a terbium activated rare earth element acid sulfide type of phosphor, such as $Y_2O_2S$:Tb, $Gd_2O_2S$:Tb, $La_2O_2S$:Tb, $(Y,Gd)_2O_2S$:Tb, or $(Y,Gd)O_2S$:Tb,Tm, a terbium activated rare earth element phosphate type of phosphor, such as $YPO_4$:Tb, $GdPO_4$:Tb, or $LaPO_4$:Tb, a terbium activated rare earth element oxyhalide type of phosphor, such as LaOBr:Tb, LaOBr:Tb,Tm, LaOCl:Tb, LaOCl:Tb,Tm, GdOBr:Tb, or GdOCl:Tb, a thulium activated rare earth element oxyhalide type of phosphor, such as LaOBr:Tm or LaOCl:Tm, a barium sulfate type of phosphor, such as $BaSO_4$:Pb, $BaSO_4:Eu^{2+}$, or (Ba, Sr)$SO_4:Eu^{2+}$, a bivalent europium activated alkaline earth metal phosphate type of phosphor, such as $Ba_3(PO_4)_2:Eu^{2+}$, a bivalent europium activated alkaline earth metal fluorohalide type of phosphor, such as $BaFCl:Eu^{2+}$, $BaFBr:Eu^{2+}$, $BaFCl:Eu^{2+}$, Tb, $BaFBr:Eu^{2+}$, Tb, $BaF_2{\cdot}BaCl_2{\cdot}KCl:Eu^{2+}$, or $(Ba, Mg)F_2{\cdot}BaCl_2{\cdot}KCl:Eu^{2+}$, an iodide type of phosphor, such as CsI:Na, CsI:Tl, NaI, or KI:Tl, a sulfide type of phosphor, such as ZnS:Ag, (Zn,Cd)S:Ag, (Zn, Cd)S:Cu, or (Zn,Cd)S:Cu,Al, a hafnium phosphate type of phosphor, such as $HfP_2O_7$:Cu, and a tantalate type of phosphor, such as $YTaO_4$, $YTaO_4$:Tm, $YTaO_4$:Nb, (Y, Sr)$TaO_{4-x}$:Nb, $LuTaO_4$, $LuTaO_4$:Nb, (Lu,Sr)$TaO_{4-x}$:Nb, $GdTaO_4$:Tm, or $Gd_2O_3{\cdot}Ta_2O_5{\cdot}B_2O_3$:Tb.

However, the phosphor employed in the radiation image storage panels in accordance with the present invention is not limited to the phosphors enumerated above and may be one of various other phosphors, which have the properties such that, when the phosphors are exposed to radiation, the phosphors emit light of the visible region or the near ultraviolet region.

The organic phosphorus compound, which may be employed in the first radiation image storage panel in accordance with the present invention, is represented by Formula (1):

$$(R)_nPO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.

Examples of M include a hydrogen atom, sodium, potassium, and a tetraethylammonium ion.

R should preferably be an aryl group or an aryl group substituted by methyl or ethyl. Preferable examples of R include alkyl groups having one to four carbon atoms, which may optionally be substituted by an aryl group, such as a methyl group, an ethyl group, a propyl group, a butyl group, an isopropyl group, and a diphenylmethyl group; and aryl groups, which may optionally be substituted by methyl or ethyl, such as a phenyl group, a naphthyl group, an anthryl group, a diphenyl group, a p-ethylphenyl group, a tolyl group, and a xylyl group. The aryl groups may contain a ring, such as an indene ring or a tetralin ring, other than the benzene ring.

The organic phosphorus compound described above may be used alone, or two or more organic phosphorus compounds may be used in combination. Among the organic phosphorus compounds described above, organic phosphorus compounds having an aryl group are preferable, and organic phosphorus compounds having a phenyl group are more preferable.

Preferable examples of the organic phosphorus compounds, which may be employed in the first radiation image storage panel in accordance with the present invention, include the compounds described below.

(1) p-Ethylbenzene Phosphonic Acid

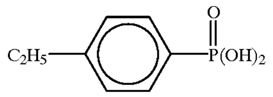

(2) Phenyl Phosphonic Acid

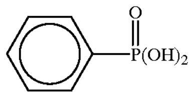

(3) Salts of the Phosphonic Acids Shown Above (4) Diphenyl Phosphinic Acid

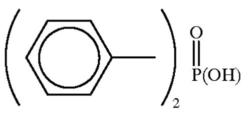

(5) Salts of the Phosphinic Acid Shown Above

The organic phosphorus compound, which may be employed in the second radiation image storage panel in accordance with the present invention, is represented by either one of Formula (2) and Formula (3):

(2)

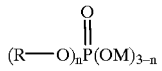

$(R'—O)_nP(OM)_{3-n}$ (3)

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.

R' should preferably be an aryl group or an aryl group substituted by methyl or ethyl.

Preferable examples of R' include alkyl groups having one to four carbon atoms, which may optionally be substituted by an aryl group, such as a methyl group, an ethyl group, a propyl group, a butyl group, an isopropyl group, and a diphenylmethyl group; and aryl groups, which may optionally be substituted by methyl or ethyl, such as a phenyl group, a naphthyl group, an anthryl group, a diphenyl group, a p-ethylphenyl group, a tolyl group, and a xylyl group. The aryl groups may contain a ring, such as an indene ring or a tetralin ring, other than the benzene ring.

Preferable examples of the organic phosphorus compounds represented by Formula (2) or Formula (3), which may be employed in the second radiation image storage panel in accordance with the present invention, include the compounds described below.

(1) α-Naphthyl Phosphoric Acid

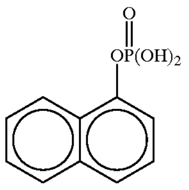

(2) Phenyl Phosphoric Acid

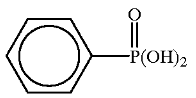

(3) Diphenyl Phosphoric Acid

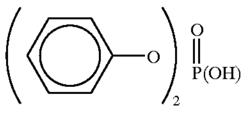

(4) Salts of Mono- or Di-esters of Phosphoric Acids Shown Above (5) Di-n-butyl Phosphite $(n-C_4H_9O)_2P(OH)$ (6) Diethyl Phosphite $(n-C_2H_5O)_2P(OH)$ (7) Diphenyl Phosphite

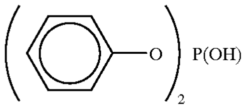

(8) Salts of Mono- or Di-esters of the Phosphites Shown Above

Among the organic phosphorus compounds described above, which are represented by Formula (2) or Formula (3) organic phosphorus compounds having an aryl group are preferable, and organic phosphorus compounds having a phenyl group are more preferable.

There is no risk that colors of the organic phosphorus compounds contained in the first and second radiation image storage panels in accordance with the present invention will affect adversely upon the stimulating rays or light emitted by the radiation image storage panels. Therefore, the organic phosphorus compounds should preferably be colorless or should preferably have a light yellow color.

Ordinarily, the organic phosphorus compounds have the properties such that the organic phosphorus compounds are adsorbed or bonded to metal surfaces via the polar groups described above. It is presumed that, in the phosphor layers of the first and second radiation image storage panels in accordance with the present invention, the organic phosphorus compounds are present in the state, in which the organic phosphorus compounds are adsorbed or bonded primarily to the surfaces of the phosphor particles via the polar groups described above. The organic phosphorus compounds have the advantages over organic acid compounds, such as carboxylic acids and sulfonic acids, in that the adsorption force with respect to the metal surfaces is strong, and the organic phosphorus compounds are not apt to undergo desorption from the metal surfaces. Therefore, it is presumed that the organic phosphorus compounds are firmly adsorbed to the surfaces of the phosphor particles contained in the phosphor layers of the first and second radiation image storage panels in accordance with the present invention, and the surfaces of the phosphor particles are brought into the state such that the surfaces are covered with the aromatic rings, and the like. As a result, the affinity of the phosphor particles with respect to the resin constituents will presumably be enhanced, and the stability of the dispersed state of the phosphor particles will presumably be enhanced.

Also, it is considered that, by virtue of the effects of the organic phosphorus compound described above, the phosphor particles and the binder have a strong mutual action. Therefore, it is considered that, after the phosphor layer has been formed, the binder does not undergo desorption from the surfaces of the phosphor particles. As a result, durability of the radiation image storage panel against movement operations is capable of enhanced markedly. Furthermore, since the organic phosphorus compounds employed in the first and second radiation image storage panels in accordance with the present invention have a lower susceptibility to water than other organic acid compounds, such as sulfonic acid, a radiation image storage panel having a high water resistance and good durability is capable of being obtained.

In each of the first and second radiation image storage panels in accordance with the present invention, ordinarily, the content of the organic phosphorus compound in the phosphor layer should preferably fall within the range of 0.001 to 5 parts by weight per 100 parts by weight of the phosphor particles. Such that a better dispersed state of the phosphor particles may be obtained and the glossiness of the phosphor layer surface may be enhanced, the content of the organic phosphorus compound in the phosphor layer should more preferably fall within the range of 0.005 to 2 parts by weight per 100 parts by weight of the phosphor particles. Also, such that the light emission characteristics may be enhanced markedly, the content of the organic phosphorus compound in the phosphor layer should most preferably fall within the range of 0.01 to 1 part by weight per 100 parts by weight of the phosphor particles. If the content of the organic phosphorus compound in the phosphor layer is lower than 0.001 part by weight per 100 parts by weight of the phosphor particles, it will often become impossible to obtain the effects of the organic phosphorus compound. Even if the content of the organic phosphorus compound in the phosphor layer is higher than 5 parts by weight per 100 parts by weight of the phosphor particles, further enhancement of the dispersed state of the phosphor particles cannot be expected.

In the third radiation image storage panel in accordance with the present invention, the phosphor layer contains the stimulable phosphor or the phosphor described above, the binder, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms.

In the third radiation image storage panel in accordance with the present invention, the aralkyl phosphonic acid should preferably be represented by Formula (4), in which Ar represents a phenyl group or a substituted phenyl group, R" represents analiphatic group having one or two carbon atoms, and m represents an integral number of 1 or 2.

The aralkyl phosphonic acid acting as the surface modifying agent must contain at least one kind of aromatic ring and a phosphonic acid group. As clear from Formula (4), the phosphonic acid group is separated by at least one carbon atom from the aromatic ring. Examples of the aralkyl phosphonic acids, which may be employed preferably in the third radiation image storage panel in accordance with the present invention, include phenethyl phosphonic acid; benzhydryl phosphonic acid; benzyl phosphonic acid; and substitution derivatives of the above enumerated phosphonic acids, such as 4-nitrobenzyl phosphonic acid, 3-methoxybenzyl phosphonic acid, 4-methoxybenzyl phosphonic acid, 4-t-butylbenzyl phosphonic acid, 4-methylthiobenzyl phosphonic acid, 4-methanesulfonylbenzyl phosphonic acid, 4-trifluoromethylbenzyl phosphonic acid, 2,3-difluorobenzyl phosphonic acid, and 2,3,4,5,6-pentafluorobenzyl phosphonic acid. Synthesis of the above-enumerated aralkyl phosphonic acids is described in detail in Japanese Unexamined Patent Publication No. 10(1998)-70022.

The aralkyl phosphonic acids have the properties such that the aralkyl phosphonic acids are adsorbed or bonded to metal surfaces via the polar groups described above. It is presumed that, in the phosphor layer of the third radiation image storage panel in accordance with the present invention, the aralkyl phosphonic acid is present in the state, in which the aralkyl phosphonic acid is adsorbed or bonded primarily to the surfaces of the phosphor particles via the polar group described above. The aralkyl phosphonic acids have the advantages over organic acid compounds, such as carboxylic acids and sulfonic acids, in that the adsorption force with respect to the metal surfaces is strong, and the aralkyl phosphonic acids are not apt to undergo desorption from the metal surfaces. Therefore, it is presumed that the aralkyl phosphonic acid is firmly adsorbed to the surfaces of the phosphor particles contained in the phosphor layer of the third radiation image storage panel in accordance with the present invention, and the surfaces of the phosphor particles are brought into the state such that the surfaces are covered with the aromatic rings, and the like. As a result, the affinity of the phosphor particles with respect to the resin constituents will presumably be enhanced, and the stability of the dispersed state of the phosphor particles will presumably be enhanced.

Also, it is considered that, by virtue of the effects of the aralkyl phosphonic acid described above, the phosphor particles and the binder have a strong mutual action. Therefore, it is considered that, after the phosphor layer has been formed, the binder does not undergo desorption from the surfaces of the phosphor particles. As a result, durability of the radiation image storage panel against movement operations is capable of enhanced markedly. Furthermore, since the aralkyl phosphonic acid employed in the third radiation image storage panel in accordance with the present invention has a lower susceptibility to water than other organic acid compounds, such as sulfonic acid, a radiation image storage panel having a high water resistance and good durability is capable of being obtained.

In the third radiation image storage panel in accordance with the present invention, ordinarily, the content of the aralkyl phosphonic acid in the phosphor layer should preferably fall within the range of 0.001 to 5 parts by weight per 100 parts by weight of the phosphor particles. Such that a better dispersed state of the phosphor particles may be obtained and the glossiness of the phosphor layer surface may be enhanced, the content of the aralkyl phosphonic acid in the phosphor layer should more preferably fall within the range of 0.005 to 2 parts by weight per 100 parts by weight of the phosphor particles. Also, such that the light emission characteristics may be enhanced markedly, the content of the aralkyl phosphonic acid in the phosphor layer should most preferably fall within the range of 0.01 to 1 part by weight per 100 parts by weight of the phosphor particles. If the content of the aralkyl phosphonic acid in the phosphor layer is lower than 0.001 part by weight per 100 parts by weight of the phosphor particles, it will often become impossible to obtain the effects of the aralkyl phosphonic acid. Even if the content of the aralkyl phosphonic acid in the phosphor layer is higher than 5 parts by weight per 100 parts by weight of the phosphor particles, further enhancement of the dispersed state of the phosphor particles cannot be expected.

By way of example, the first, second, and third radiation image storage panels in accordance with the present invention may be produced with the process described below. The process for producing the radiation image storage panels containing the stimulable phosphor will be described hereinbelow. In cases where the first, second, and third radiation image storage panels in accordance with the present invention are utilized as the intensifying screens for use in the radiography, the intensifying screens may be produced in a similar manner.

The first, second, and third radiation image storage panels in accordance with the present invention may be produced with a process comprising the steps of:

i) subjecting the phosphor particles, the organic phosphorus compound or the aralkyl phosphonic acid, the binder, and the like, to dispersing processing in order to prepare a coating composition, ii) performing application of the coating composition in order to form a phosphor sheet, iii) locating the phosphor sheet, which has been formed with the dispersing processing and the application of the coating composition, on a substrate, and iv) compressing the phosphor sheet, which has been located on the substrate, at a temperature equal to at least a softening temperature or a melting temperature of the binder, the phosphor sheet and the substrate being thereby adhered to each other.

Alternatively, the first, second, and third radiation image storage panels in accordance with the present invention may be produced with a process comprising the steps of:

i) subjecting the phosphor particles to surface treatment with the organic phosphorus compound or the aralkyl phosphonic acid, ii) subjecting the surface-treated phosphor particles and the binder to dispersing processing in order to prepare a coating composition, iii) performing application of the coating composition in order to form a phosphor sheet, iv) locating the phosphor sheet, which has been formed with the dispersing processing and the application of the coating composition, on a substrate, and v) compressing the phosphor sheet, which has been located on the substrate, at a temperature equal to at least a softening temperature or a melting temperature of the binder, the phosphor sheet and the substrate being thereby adhered to each other.

In an example of the technique for enhancing the dispersibility of the phosphor particles by the addition of the organic phosphorus compound or the aralkyl phosphonic acid, the organic phosphorus compound or the aralkyl phosphonic acid may be dissolved or dispersed in an organic solvent having a low boiling temperature, and the phosphor particles may be introduced into and mixed with the resulting solution or the resulting dispersion. Thereafter, the organic solvent may be removed, and the surface-treated phosphor particles may thereby be prepared. Also, the phosphor layer may be formed by use of the phosphor particles, and the radiation image storage panel may be produced by utilizing the phosphor layer. In a different example of the technique for enhancing the dispersibility of the phosphor particles by the addition of the organic phosphorus compound or the aralkyl phosphonic acid, the organic phosphorus compound or the aralkyl phosphonic acid may be introduced into a coating composition for the formation of the phosphor layer, preferably in the state in which the organic phosphorus compound or the aralkyl phosphonic acid has been dissolved or dispersed in a portion of a solvent utilized for the preparation of the coating composition for the formation of the phosphor layer, and the resulting mixture may be subjected to kneading and dispersing processing.

As the binder utilized in the first, second, and third radiation image storage panels in accordance with the present invention, a thermoplastic resin, which has elasticity at normal temperatures and which exhibits fluidity when being heated, should preferably be employed. Examples of the thermoplastic resins include a polyurethane, a polystyrene type of elastomer, a polyolefin type of copolymer, a polyester, a polyamide, a polybutadiene, an ethylene-vinyl acetate copolymer, a vinyl chloride type of copolymer, natural rubber, fluorine rubber, a polyisoprene, a chlorinated polyethylene, a butadiene type of copolymer, and silicone rubber.

Of the above-enumerated thermoplastic resins, elastomers are more preferable. As the elastomers, ordinarily, elastomers having a softening temperature or a melting temperature falling within the range of 30° C. to 300° C. are employed. Elastomers having a softening temperature or a melting temperature falling within the range of 30° C. to 150° C. are particularly preferable.

In particular, polyurethane resins are preferable. Polyurethane resins having functional groups, such as a sulfonic acid group, a carboxylic acid group, and a phosphoric acid group are more preferable.

The binder described above, the phosphor, and the solvent are mixed together sufficiently. In this manner, the coating composition, in which the phosphor has been dispersed uniformly in a binder solution, is prepared.

Examples of the solvents include lower alcohols, such as methyl alcohol, ethyl alcohol, n-propyl alcohol, and n-butyl alcohol; chlorine atom-containing hydrocarbons, such as methylene chloride and ethylene chloride; ketones, such as acetone, methyl ethyl ketone, and methyl isopropyl ketone; esters of lower fatty acids with lower alcohols, such as methyl acetate, ethyl acetate, and butyl acetate; ethers, such as dioxane, ethylene glycol monoethyl ether, and ethylene glycol monomethyl ether; and mixtures of two or more of the above-enumerated solvents.

The mixing ratio of the binder to the phosphor in the coating composition varies for different characteristics desired for the radiation image storage panel, different kinds of the phosphors, and the like. Ordinarily, the mixing ratio of the binder to the phosphor is selected from the range between 1:1 and 1:100 (weight ratio). The mixing ratio of the binder to the phosphor should preferably be selected from the range between 1:8 and 1:40 (weight ratio).

The coating composition may also contain various additives, such as plasticizers for enhancing the binding force between the binder and the phosphor in the phosphor layer after being formed. Examples of the plasticizers utilized for such purposes include phosphoric acid esters, such as triphenyl phosphate, tricresyl phosphate, and diphenyl phosphate; phthalic acid esters, such as diethyl phthalate and dimethoxyethyl phthalate; glycolic acid esters, such as ethylphthalylethyl glycolate and butylphthalylbutyl glycolate; and polyesters of a polyethylene glycol with an aliphatic dibasic acid, such as a polyester of triethylene glycol with adipic acid, and a polyester of diethylene glycol with succinic acid.

The coating composition, which contains the phosphor and the binder and has been prepared in the manner described above, is uniformly applied onto a surface of a temporary substrate for the formation of a sheet. In this manner, a coating film of the coating composition is formed. The operation for applying the coating composition onto the temporary substrate may be performed by utilizing ordinary coating means, such as an extrusion coater, a slide coater, a doctor blade, a roll coater, or a knife coater.

The temporary substrate may be constituted of a material selected from a glass plate, a metal plate, various kinds of materials, which are employed as substrates for intensifying paper (or an intensifying screen) in the conventional radiography, and materials known as substrates for radiation image storage panels. Examples of the materials for the temporary substrates include films of resins, such as cellulose triacetate, a polyethylene terephthalate, a polyamide, a polyimide, and a polycarbonate; metal sheets, such as an aluminum alloy foil and a stainless steel foil; paper, such as ordinary paper, baryta paper, resin-coated paper, pigment paper containing a pigment, such as titanium dioxide, and paper sized with a polyvinyl alcohol, or the like; and plates or sheets of ceramic materials, such as alumina, zirconia, magnesia, and titania.

The coating composition for the formation of the phosphor layer is applied onto the temporary substrate and dried. The dried coating film is separated from the temporary substrate, and the phosphor sheet acting as the phosphor layer of the radiation image storage panel is thereby formed. Therefore, before the coating composition for the formation of the phosphor layer is applied onto the temporary substrate, a releasing agent is applied onto the surface of the temporary substrate, such that the phosphor sheet having been formed on the temporary substrate can easily be separated from the temporary substrate.

Thereafter, besides the phosphor sheet having been formed in the manner described above, a substrate of the radiation image storage panel is prepared. The substrate may be constituted of a material selected from the same materials as those for the temporary substrate, which is utilized for the formation of the phosphor sheet.

In conventional radiation image storage panels, such that the binding strength between the substrate and the phosphor layer may be enhanced, or such that the sensitivity of the radiation image storage panel may be enhanced or an image having good image quality (with respect to sharpness and graininess) may be obtained with the radiation image storage panel, a high-molecular weight substance, such as a polyester copolymer or an acrylic resin copolymer, is applied onto the surface of the substrate, on which surface the phosphor layer is to be overlaid, in order to form an adhesive properties imparting layer, or a light reflecting layer constituted of a light reflecting substance, such as titanium dioxide, a light absorbing layer constituted of a light absorbing substance, such as carbon black, or the like, is formed on the surface of the substrate, on which surface the phosphor layer is to be overlaid. In the radiation image storage panels in accordance with the present invention, various such layers may be formed on the substrate. The layer constitution may be selected arbitrarily in accordance with the characteristics which the radiation image storage panels should have, and the like.

Also, as described in Japanese Unexamined Patent Publication No. 59(1984)-200200, such that an image having a high sharpness may be obtained, fine concavities and convexities may be formed on the surface of the substrate, on which surface the phosphor layer is to be overlaid. (In cases where the adhesive properties imparting layer, the light reflecting layer, the light absorbing layer, or the like, is formed on the surface of the substrate, on which surface the phosphor layer is to be overlaid, fine concavities and convexities may be formed on the surface of the layer formed on the substrate.)

The phosphor sheet, which has been obtained with the dispersing processing and the application of the coating composition, is located on the substrate. The phosphor sheet, which has been located on the substrate, is then compressed at a temperature equal to at least a softening temperature or a melting temperature of the binder. In this manner, the phosphor sheet and the substrate are adhered to each other.

Examples of compression apparatuses, which may be utilized for the compression processing in the processes for producing the radiation image storage panels in accordance with the present invention, include known compression apparatuses, such as a calender roll apparatus and a hot press. With the calender roll apparatus, the compression processing is performed by locating the phosphor sheet, which has been obtained with the dispersing processing and the application of the coating composition, on the substrate, and the phosphor sheet having been located on the substrate is passed at a predetermined speed between rollers, which has been heated to a temperature equal to at least the softening temperature or the melting temperature of the binder. However, the compression apparatuses, which may be utilized for the compression processing in the processes for producing the radiation image storage panels in accordance with the present invention, are not limited to the compression apparatuses described above and may be selected from various other compression apparatuses, with which the sheet of the type described above can be heated and compressed. The pressure under which the compression processing is performed should preferably be at least 5 MPa.

In ordinary radiation image storage panels, a transparent protective film for physically and chemically protecting the phosphor layer is overlaid upon the surface of the phosphor layer, which surface is opposite to the surface in contact with the substrate. The radiation image storage panels in accordance with the present invention should preferably be also provided with the transparent protective film.

The transparent protective film may be constituted of a fluorine resin copolymer; a cellulose derivative, such as cellulose acetate or nitro cellulose; or a transparent synthetic resin, such as a polymethyl methacrylate, a polyvinyl butyral, a polyvinyl formal, a polycarbonate, a polyvinyl acetate, or a vinyl chloride-vinyl acetate copolymer. The transparent protective film may be formed by applying a solution, which contains one of the above-enumerated materials in an appropriate solvent, onto the surface of the phosphor layer. Alternatively, the transparent protective film may be formed by preparing a protective film forming sheet and adhering the protective film forming sheet to the surface of the phosphor layer by use of an appropriate adhesive agent. The protective film forming sheet may be constituted of a plastic sheet formed from a polyethylene terephthalate, a polyethylene naphthalate, a polyethylene, a polypropylene, a polyvinylidene chloride, or a polyamide; or a transparent glass plate. Ordinarily, the thickness of the protective film should preferably fall within the range of approximately 0.1 $\mu$m to approximately 20 $\mu$m.

Further, such that the sharpness of the obtained image may be enhanced, a colored layer, which absorbs the stimulating rays and does not absorb the light emitted by the stimulable phosphor, may be added at least to one of the layers described above. (The colored layer is described in, for example, Japanese Patent Publication No. 59(1984)-23400.)

The present invention will further be illustrated by the following non-limitative examples.

EXAMPLE 1

Firstly, a phosphor sheet acting as a phosphor layer was prepared in the manner described below. A coating composition for forming a phosphor sheet was prepared in the manner described below. Specifically, 1,000 g of a phosphor (a phosphor represented by the formula $BaFBr_{0.85}I_{0.15}:Eu^{2+}$), 35.5 g of a polyurethane elastomer [Pandex T-5265H (solid) , supplied by Dainippon Ink and Chemicals, Inc.] acting as a binder, 4.5 g of a polyisocyanate [Coronate HX (solid content: 100%), supplied by Nippon Polyurethane K.K.] acting as a crosslinking agent, 10 g of an epoxy resin [Epikote #1001 (solid), supplied by Yuka Shell Epoxy K.K.] acting as an anti-yellowing agent, 0.02 g of ultramarine blue (SM-1, supplied by Daiichi Kasei Kogyo K.K.) acting as a coloring agent, and 0.2 g of phenyl phosphonic acid acting as an organic phosphorus compound were added to a methyl ethyl ketone/toluene mixed solvent (methyl ethyl ketone:toluene=7:3). The resulting mixture was subjected to dispersing processing, which was performed with a "disper" apparatus for three hours. In this manner, the coating composition having a viscosity of 3 Pa·s (25° C.) was prepared. The thus prepared coating composition was applied with an extrusion coater onto a temporary substrate (a polyethylene terephthalate sheet having a thickness of 180 μm, on which a silicone type releasing agent had been applied). The applied coating composition was then dried and separated from the temporary substrate. In this manner, a phosphor sheet having a thickness of 300 μm was prepared.

Thereafter, a reflecting material layer was formed in the manner described below. Specifically, 350 g of fine particles of gadolinium oxide ($Gd_2O_3$) (in which the particle diameters of 90 wt % particles among all particles fell within the range of 1 μm to 5 μm), 1,800 g of a soft acrylic resin [Criscoat P-1018GS (20% toluene solution), supplied by Dainippon Ink and Chemicals, Inc.] acting as a binder, 40 g of a phthalic acid ester (#10, supplied by Daihachi Kagaku K.K.) acting as a plasticizer, 120 g of ZnO whisker (Panatetra A-1-1, supplied by Matsushita Amtec Co., Inc.) acting as a conductive agent, and 2 g of ultramarine blue (SM-1, supplied by Daiichi Kasei Kogyo K.K.) acting as a coloring agent were added to methyl ethyl ketone. The resulting mixture was subjected to dispersing and dissolving processing, which was performed with a "disper" apparatus. In this manner, a dispersion for forming the reflecting material layer, which dispersion had a viscosity of 0.5Pa·s (20° C.), was prepared. The dispersion for forming the reflecting material layer was then uniformly applied onto a substrate [a polyethylene terephthalate sheet; Lumirror S-10, 250 μm, haze degree (typical): 27, supplied by Toray Industries, Inc., provided with a light blocking layer (thickness: approximately 18 μm) on one side, the light blocking layer being constituted of carbon black, silica, and a binder]. At this time, the dispersion for forming the reflecting material layer was applied onto a surface of the substrate, which surface was opposite to the surface on the side of the light blocking layer, with an extrusion coater. The coating film of the dispersion was then dried. In this manner, the reflecting material layer having a thickness of 20 μm was formed.

Thereafter, the phosphor sheet and the substrate having been provided with the reflecting material layer were superposed one upon the other. Also, compression processing was performed continuously with a calender roll apparatus under the conditions of a pressure of 49 MPa, an upper roll temperature of 75° C., a lower roll temperature of 75° C., and a feed rate of 1.0 m/min. With the compression processing with heat, the phosphor sheet was perfectly fused as the phosphor layer (thickness: 210 μm) to the substrate via the reflecting material layer.

Thereafter, 185 g of a fluoro olefin-vinyl ether copolymer [Lumiflon LF-504X (30% xylene solution) supplied by Asahi Glass Co., Ltd.] acting as a fluorine type of resin, log of a polyisocyanate [Sumidur N3500 (solid content: 100%), supplied by Sumitomo Bayer Urethane K.K.] acting as a crosslinking agent, 1 g of an alcohol-modified silicone [X-22-2809 (66% xylene-containing paste), supplied by Shin-Etsu Chemical Co., Ltd.] acting as a lubricant, 13 g of a melamine-formaldehyde (Eposter S6, supplied by Nippon Shokubai Kagaku Kogyo Co., Ltd.) acting as an organic filler, 0.2 g of an acetalkoxy aluminum di-isopropylate (Plenact AL-M, supplied by Ajinomoto Co., Inc.) acting as a coupling agent, and 0.7 mg of dibutyltin dilaurate (KS1260, supplied by Kyodo Yakuhin K.K.) acting as a catalyst were added to 133 g of methyl ethyl ketone. In this manner, a coating composition having a viscosity of 3mPa·s was prepared. The thus prepared coating composition was then applied onto a 9 μm-thick PET film (Lumirror 9-F53, supplied by Toray Industries, Inc.), which had previously been adhered to a heat-resistant peelable film (CT38, supplied by PANAC K.K.). The applied coating composition was subjected to heat treatment at 20° C. for 20 minutes and was thereby thermally cured and dried. In this manner, a coating layer having a thickness of 2 μm was formed. Thereafter, the heat-resistant peelable film was separated from the 9 μm-thick PET film having been provided with the coating layer. Also, a solution containing a polyester resin (Vylon 30SS, supplied by Toyobo Co., Ltd.) was applied onto the surface of the 9 μm-thick PET film, which surface was opposite to the surface provided with the coating layer. The applied solution was dried to form an adhesive layer (adhesive agent application rate: 2 $g/m^2$). The PET film was then adhered to the phosphor layer via the adhesive layer by using laminating rolls, and a protective layer was thereby formed on the phosphor layer. Further, an emboss (surface roughness Ra, expressed in terms of arithmetic mean deviation: 0.4 μm) was formed on the protective layer by utilizing an embossing machine.

Thereafter, a solution containing an unsaturated polyester resin (Vylon 30SS, supplied by Toyobo Co., Ltd.) was applied onto a 20 μm-thick OPP film (Torayfine YM-11 #20, supplied by Toray Industries, Inc.) and dried to form an adhesive layer (adhesive agent application rate: 9 $g/m^2$). The OPP film was then adhered to a surface of the substrate, which surface was opposite to the surface provided with the phosphor layer (i.e., which surface was on the side of the light blocking layer), via the adhesive layer by using laminating rolls, and a back protective layer was thereby formed on the substrate.

Finally, 70 g of a polyurethane having a polydimethylsiloxane unit [Daiallomer SP-3023 (15% methyl ethyl ketone/toluene solution), supplied by Dainichi Seika K.K.] acting as a silicone type of polymer, 3 g of a polyisocyanate [Crossnate D-70 (50% solution), supplied by Dainichi Seika K.K.] acting as a crosslinking agent, 0.6 g of an epoxy resin [Epikote #1001 (solid), supplied by Yuka Shell Epoxy K.K.] acting as an anti-yellowing agent, and 0.2 g of an alcohol-modified silicone [X-22-2809 (66% xylene-containing paste), supplied by Shin-Etsu Chemical Co., Ltd.] acting as a lubricant were dissolved in 15 g of methyl ethyl ketone, and a coating composition was thereby prepared. The thus prepared coating composition was then applied onto side faces of the phosphor sheet provided with the protective layer, which phosphor sheet had been formed in the manner described above. In the manner described above, a radiation image storage panel, which was provided with the protective layers and whose upper surface and side faces had been protected, was produced.

EXAMPLE 2

A radiation image storage panel was produced in the same manner as that in Example 1, except that the amount of phenyl phosphonic acid used for the formation of the phosphor sheet was altered to 0.5 g.

EXAMPLE 3

A radiation image storage panel was produced in the same manner as that in Example 1, except that the amount of phenyl phosphonic acid used for the formation of the phosphor sheet was altered to 1 g.

EXAMPLE 4

A radiation image storage panel was produced in the same manner as that in Example 1, except that the amount of phenyl phosphonic acid used for the formation of the phosphor sheet was altered to 5 g.

EXAMPLE 5

A solution was prepared by adding 0.5 part of phenyl phosphonic acid to 199.5 parts of methyl ethyl ketone and dissolving phenyl phosphonic acid. Thereafter, 1,000 parts of the stimulable phosphor particles, which were of the same type as those employed in Example 1, were introduced into the thus prepared solution and mixed together. The resulting mixture was then heated to remove methyl ethyl ketone, and the stimulable phosphor particles having been treated with phenyl phosphonic acid were thereby obtained.

A radiation image storage panel was produced in the same manner as that in Example 1, except that the stimulable phosphor particles having been treated with phenyl phosphonic acid, which particles had been obtained in the manner described above, were employed, and phenyl phosphonic acid was not added at the time of the kneading and dispersing processing for the formation of the phosphor sheet.

EXAMPLE 6

A radiation image storage panel was produced in the same manner as that in Example 1, except that diphenyl phosphonic acid was employed in lieu of phenyl phosphonic acid.

Comparative Example 1

A radiation image storage panel was produced in the same manner as that in Example 1, except that the organic phosphorus compound was not added at the time of the kneading and dispersing processing for the formation of the phosphor sheet.

Evaluation of Radiation Image Storage Panel

As for each of the radiation image storage panels produced in Examples 1 to 6 and Comparative Example 1, the phosphor packing rate in the phosphor layer was calculated with the formula shown below. The density of the phosphor was taken as 5.1 g/cm$^3$, and the density of the binder was taken as 1.14 g/cm$^3$.

(Calculation of Void Content)

The thickness d (in units of cm) and the weight W (in units of g) of a 3 cm-square phosphor layer piece were measured. The void content was calculated with the formula shown below from the difference between the theoretical value of the density and the measured value of the density.

$$100-\left(\frac{(Wp+Wb)/(Wb/\rho p+Wb/\rho b)-(W/3\times 3\times d)}{(Wp+Wb)/(Wp/\rho p+Wb/\rho b)}\right)\times 100$$

in which Wp represents the weight (in units of g) per unit of the phosphor, Wb represents the weight (in units of g) per unit of the binder, ρp represents the density of the phosphor (approximately 5.0), and pb represents the density of the binder (approximately 1.2).

(Evaluation of Image Quality)

The image quality obtained with the radiation image storage panel was evaluated in the manner described below. Specifically, X-rays produced at a tube voltage of 80 kVp were irradiated to the radiation image storage panel. Thereafter, the radiation image storage panel was scanned with a He-Ne laser beam (wavelength: 632.8 nm) acting as stimulating rays, and the phosphor contained in the radiation image storage panel was thereby stimulated. Light, which was emitted by the phosphor layer when the phosphor layer was exposed to the He-Ne laser beam, was received and converted into an electric signal. A visible image was then reproduced from the electric signal by utilizing an image reproducing apparatus, and the reproduced image was displayed on a display device. The amount of the light emitted by the phosphor layer was measured, and noise (RM) at an X-ray dose of 10 mR was measured. As a measuring device, FCR9000 supplied by Fuji Photo Film Co., Ltd. was utilized.

(Evaluation of Durability Against Movement Operations)

The radiation image storage panel was moved 10,000 times at a temperature of 10° C. and humidity of 90% RH by utilizing a panel moving machine, which simulated the mechanism of FCR9000. Thereafter, a visible image was reproduced, and an investigation was made as to whether abnormality occurred or did not occurred with the image. The "○" mark indicates that no abnormality occurred with the image. The "Δ" mark indicates that slight abnormality occurred with the image. The "X" mark indicates that indicates that abnormality occurred with the image.

The results shown in Table 1 below were obtained.

TABLE 1

| | Phosphor Packing rate | Amount of emitted light | Noise ($\times 10^{-2}$) | Durability against movement operations |
|---|---|---|---|---|
| Ex. 1 | 77 | 114 | 0.17 | ○ |
| Ex. 2 | 76 | 114 | 0.14 | ○ |
| Ex. 3 | 78 | 115 | 0.12 | ○ |
| Ex. 4 | 78 | 115 | 0.12 | ○ |
| Ex. 5 | 76 | 115 | 0.13 | ○ |
| Ex. 6 | 75 | 113 | 0.19 | ○ |
| Comp. Ex. 1 | 71 | 100 | 0.28 | Δ |

The amount of emitted light was expressed with the relative value with the amount of light, which was emitted by the radiation image storage panel of Comparative Example 1, being taken as 100.

As clear from Table 1, the first radiation image storage panel in accordance with the present invention has a high phosphor packing rate, and yields a large amount of emitted light and little graininess noise. Also, the first radiation image storage panel in accordance with the present invention has good durability against movement operations.

As described above, with the first radiation image storage panel in accordance with the present invention, wherein the phosphor layer contains the organic phosphorus compound, the dispersibility of the stimulable phosphor is capable of being enhanced, and the phosphor packing rate is capable of being enhanced such that the sensitivity may not be adversely affected by the compression processing. Therefore, an image having good image quality with little noise is capable of being formed. Also, the first radiation image storage panel in accordance with the present invention has good moisture resistance and enhanced durability against movement operations.

EXAMPLE 7

Firstly, a phosphor sheet acting as a phosphor layer was prepared in the manner described below. A coating composition for forming a phosphor sheet was prepared in the manner described below. Specifically, 1,000 g of a phosphor (a phosphor represented by the formula $BaFBr_{0.85}I_{0.15}:Eu^{2+}$), 35.5 g of a polyurethane elastomer [Pandex T-5265H (solid), supplied by Dainippon Ink and Chemicals, Inc.] acting as a binder, 4.5 g of a polyisocyanate [Coronate HX (solid content: 100%), supplied by Nippon Polyurethane K.K.] acting as a crosslinking agent, 10 g of an epoxy resin [Epikote #1001 (solid), supplied by Yuka Shell Epoxy K.K.] acting as an anti-yellowing agent, 0.02 g of ultramarine blue (SM-1, supplied by Daiichi Kasei Kogyo K.K.) acting as a coloring agent, and 0.2 g of phenyl phosphoric acid acting as an organic phosphorus compound were added to a methyl ethyl ketone/toluene mixed solvent (methyl ethyl ketone:toluene=7:3). The resulting mixture was subjected to dispersing processing, which was performed with a “disper” apparatus for three hours. In this manner, the coating composition having a viscosity of 3Pa·s (25° C.) was prepared. The thus prepared coating composition was applied with an extrusion coater onto a temporary substrate (a polyethylene terephthalate sheet having a thickness of 180 μm, on which a silicone type releasing agent had been applied). The applied coating composition was then dried and separated from the temporary substrate. In this manner, a phosphor sheet having a thickness of 300 μm was prepared.

Thereafter, the procedures subsequent to the preparation of the phosphor sheet were performed in the same manner as that in Example 1. In this manner, a radiation image storage panel, which was provided with the protective layers and whose upper surface and side faces had been protected, was produced.

EXAMPLE 8

A radiation image storage panel was produced in the same manner as that in Example 7, except that the amount of phenyl phosphoric acid used for the formation of the phosphor sheet was altered to 0.5 g.

EXAMPLE 9

A radiation image storage panel was produced in the same manner as that in Example 7, except that the amount of phenyl phosphoric acid used for the formation of the phosphor sheet was altered to 1 g.

EXAMPLE 10

A radiation image storage panel was produced in the same manner as that in Example 7, except that the amount of phenyl phosphoric acid used for the formation of the phosphor sheet was altered to 5 g.

EXAMPLE 11

A solution was prepared by adding 0.5 g of phenyl phosphoric acid to 199.5 g of methyl ethyl ketone and dissolving phenyl phosphoric acid. Thereafter, 1000 g of the stimulable phosphor particles, which were of the same type as those employed in Example 7, were introduced into the thus prepared solution and mixed together. The resulting mixture was then heated to remove methyl ethyl ketone, and the stimulable phosphor particles having been treated with phenyl phosphoric acid were thereby obtained.

A radiation image storage panel was produced in the same manner as that in Example 7, except that the stimulable phosphor particles having been treated with phenyl phosphoric acid, which particles had been obtained in the manner described above, were employed, and phenyl phosphoric acid was not added at the time of the kneading and dispersing processing for the formation of the phosphor sheet.

EXAMPLE 12

A radiation image storage panel was produced in the same manner as that in Example 7, except that diphenyl phosphoric acid was employed in lieu of phenyl phosphoric acid.

EXAMPLE 13

A radiation image storage panel was produced in the same manner as that in Example 7, except that diphenyl phosphite was employed in lieu of phenyl phosphoric acid.

Comparative Example 2

A radiation image storage panel was produced in the same manner as that in Example 7, except that phenyl phosphoric acid was not added at the time of the kneading and dispersing processing for the formation of the phosphor sheet.

Comparative Example 3

A radiation image storage panel was produced in the same manner as that in Example 7, except that 0.2 g of a phosphoric acid compound (GAFAC RM-710, supplied by ANTARA GENERAL ANILINE Co.) was utilized as aphosphoric acid compound, which was described in Japanese Unexamined Patent Publication No.5(1993) -273396, in lieu of the organic phosphorus compound employed in Example 7.

Evaluation of Radiation Image Storage Panel

As for each of the radiation image storage panels produced in Examples 7 to 13 and Comparative Examples 2 and 3, evaluations were made in the same manner as that described above.

The results shown in Table 2 below were obtained.

TABLE 2

| | Phosphor Packing rate | Amount of emitted light | Noise ($\times 10^{-2}$) | Durability against movement operations |
|---|---|---|---|---|
| Ex. 7 | 76 | 114 | 0.17 | ○ |
| Ex. 8 | 77 | 114 | 0.14 | ○ |
| Ex. 9 | 78 | 115 | 0.12 | ○ |
| Ex. 10 | 78 | 115 | 0.12 | ○ |
| Ex. 11 | 78 | 115 | 0.12 | ○ |
| Ex. 12 | 77 | 115 | 0.15 | ○ |
| Ex. 13 | 77 | 114 | 0.15 | ○ |
| Comp. Ex. 2 | 71 | 100 | 0.28 | Δ |
| Comp. Ex. 3 | 73 | 100 | 0.23 | Δ |

The amount of emitted light was expressed with the relative value with the amount of light, which was emitted by the radiation image storage panel of Comparative Example 2, being taken as 100.

As clear from Table 2, the second radiation image storage panel in accordance with the present invention has a higher phosphor packing rate, and yields a larger amount of emitted light and less graininess noise than with the radiation image storage panel of Comparative Example 2, in which the organic phosphorus compound was not utilized. Also, the second radiation image storage panel in accordance with the present invention has good durability against movement operations. Further, the second radiation image storage panel in accordance with the present invention yields a larger amount of emitted light and less noise and has better durability against movement operations than with the radiation image storage panel of Comparative Example 3, in which the conventional phosphoric acid compound was utilized.

As described above, with the second radiation image storage panel in accordance with the present invention, wherein the phosphor layer contains the specific organic phosphorus compound, the dispersibility of the stimulable phosphor is capable of being enhanced, and the phosphor packing rate is capable of being enhanced such that the sensitivity may not be adversely affected by the compression processing. Therefore, an image having good image quality with little noise is capable of being formed. Also, the second radiation image storage panel in accordance with the present invention has good moisture resistance and enhanced durability against movement operations.

Synthetic Examples

Firstly, an aralkyl phosphonic acid was prepared from the corresponding diethyl or dimethyl ester. As a benzyl phosphonic acid diethyl ester, a commercially available compound (supplied by Wako Pure Chemical Industries, Ltd.) was utilized. Each of other diethyl or dimethyl esters was prepared from the corresponding aralkyl halide through a reaction (an Arbuzov reaction) with triethyl phosphite or trimethyl phosphite. Synthetic examples are described below.

(Synthesis 1: Synthesis of Benzyl Phosphonic Acid)

Benzyl phosphonic acid was prepared in the manner described below. Specifically, 200.40 g (878 millimols) of a benzyl phosphonic acid diethyl ester was mixed with 350 ml of distilledwater and concentrated hydrochloric acid (~12 mols) The thus obtained suspension was heated and refluxed under nitrogen for 20 hours, and a colorless transparent solution was thereby obtained. After removing 130 ml of an aqueous distillate from the solution, the residue was cooled with an ice bath, and a concentrated white slurry was thereby obtained. The slurry was washed with distilled water to remove residual hydrochloric acid and dried at room temperature. Thereafter, the thus obtained substance was dried overnight under reduced pressure, and benzyl phosphonic acid was thereby obtained.

(Synthesis 2:Synthesis of Benzhydryl Phosphonic Acid)

Benzhydryl phosphonic acid was prepared in the manner described below. Specifically, 308.93 g (1.45 mols) of bromodiphehylmethane and 240.93 g (1.45 mols) of triethyl phosphite were mixed together under nitrogen and heated little by little. The temperature of the mixture was kept at 160° C., and a bromoethane by-product was removed by distillation for a period longer than four hours. After the obtained crude product was cooled to room temperature, 750 ml of concentrated hydrochloric acid (~12 mols) and 250 ml of distilled water were added to the crude product. The resulting mixture was then refluxed under nitrogen for two days (approximately 40 hours) The thus obtained foam-like mixture was cooled and then subjected to filtration to obtain a solid material. The thus obtained solid material was washed with water to remove residual hydrochloric acid and was then washed with n-hexane to remove a hydrocarbon by-product. Thereafter, the solid material was dried overnight at 120° C. in a reduced pressure dryer. In this manner, 250.06 g (yield: 81%) of benzhydryl phosphonic acid was obtained.

(Synthesis 3: Synthesis of 4-t-butylbenzyl Phosphonic Acid)

4-t-Butylbenzyl bromide (19.16 g, 84 millimols) and trimethyl phosphite (10.46 g, 84 millimols) were dried under argon at 120° C. for six hours. After 10.46 g of trimethyl phosphite was added, heating was continued for a further period of 16 hours. Methyl phosphonic acid dimethyl ester by-product was removed by distillation. A 4-t-butylbenzyl phosphonic acid dimethyl ester remained as a light yellow oil (20.6 g, 80 millimols).

Thereafter, sodium iodide (25.6 g, 170 millimols) and trimethylsilyl chloride (22 ml, 170 millimols) were added under nitrogen to an anhydrous acetonitrile solution (220 ml) of the product having been obtained in the manner described above. A precipitate was formed immediately. The mixture was stirred at room temperature for 30 minutes, 10 ml of ethanol was added, and the stirring was further continued for 30 minutes. After the solvent had been evaporated, the residue was partitioned between ethyl acetate and water, and the aqueous phase was discarded. The organic phase was subjected to extraction with 2M NaOH. The obtained alkaline extract was washed with ether, acidified to pH1 with 10M HCl, and then subjected to extraction with ethyl acetate (3×100 ml). With evaporation of the anhydrous extract, the desired acid was obtained as a light yellow solid material (12.6 g).

EXAMPLE 14

Firstly, a phosphor sheet acting as a phosphor layer was prepared in the manner described below. A coating composition for forming a phosphor sheet was prepared in the manner described below. Specifically, 1,000 g of a phosphor (a phosphor represented by the formula $BaFBr_{0.85}I_{0.15}:Eu^{2+}$), 35.5 g of a polyurethane elastomer [Pandex T-5265H (solid), supplied by Dainippon Ink and Chemicals, Inc.] acting as a binder, 4.5 g of a polyisocyanate [Coronate HX (solid content: 100%), supplied by Nippon Polyurethane K.K.] acting as a crosslinking agent, 10 g of an epoxy resin [Epikote #1001 (solid), supplied by Yuka Shell Epoxy K.K.] acting as an anti-yellowing agent, 0.02 g of ultramarine blue (SM-1, supplied by Daiichi Kasei Kogyo K.K.) acting as a coloring agent, and 0.2 g of benzyl phosphonic acid acting as an aralkyl phosphonic acid were added to a methyl ethyl ketone/toluene mixed solvent (methyl ethyl ketone:toluene=7:3). The resulting mixture was subjected to dispersing processing, which was performed with a "disper" apparatus for three hours. In this manner, the coating composition having a viscosity of 3Pa·s (25° C.) was prepared. The thus prepared coating composition was applied with an extrusion coater onto a temporary substrate (a polyethylene terephthalate sheet having a thickness of 180 μm, on which a silicone type releasing agent had been applied). The applied coating composition was then dried and separated from the temporary substrate. In this manner, a phosphor sheet having a thickness of 300 μm was prepared.

Thereafter, the procedures subsequent to the preparation of the phosphor sheet were performed in the same manner as that in Example 1. In this manner, a radiation image storage panel, which was provided with the protective layers and whose upper surface and side faces had been protected, was produced.

EXAMPLE 15

A radiation image storage panel was produced in the same manner as that in Example 14, except that the amount of benzyl phosphonic acid used for the formation of the phosphor sheet was altered to 0.5 g.

EXAMPLE 16

A radiation image storage panel was produced in the same manner as that in Example 14, except that the amount of benzyl phosphonic acid used for the formation of the phosphor sheet was altered to 1 g.

EXAMPLE 17

A radiation image storage panel was produced in the same manner as that in Example 14, except that the amount of benzyl phosphonic acid used for the formation of the phosphor sheet was altered to 5 g.

EXAMPLE 18

A solution was prepared by adding 0.5 g of benzyl phosphonic acid to 199.5 g of methyl ethyl ketone and dissolving phenyl phosphoric acid. Thereafter, 1,000 g of the stimulable phosphor particles, which were of the same type as those employed in Example 14, were introduced into the thus prepared solution and mixed together. The resulting mixture was then heated to remove methyl ethyl ketone, and the stimulable phosphor particles having been treated with benzyl phosphonic acid were thereby obtained.

A radiation image storage panel was produced in the same manner as that in Example 14, except that the stimulable phosphor particles having been treated with benzyl phosphonic acid, which particles had been obtained in the manner described above, were employed, and benzyl phosphonic acid was not added at the time of the kneading and dispersing processing for the formation of the phosphor sheet.

EXAMPLE 19

A radiation image storage panel was produced in the same manner as that in Example 14, except that benzhydryl phosphonic acid was employed in lieu of benzyl phosphonic acid.

EXAMPLE 20

A radiation image storage panel was produced in the same manner as that in Example 14, except that 4-t-butylbenzyl phosphonic acid was employed in lieu of benzyl phosphonic acid.

Comparative Example 4

A radiation image storage panel was produced in the same manner as that in Example 14, except that benzyl phosphonic acid was not added at the time of the kneading and dispersing processing for the formation of the phosphor sheet.

Evaluation of Radiation Image Storage Panel

As for each of the radiation image storage panels produced in Examples 14 to 20 and Comparative Example 4, evaluations were made in the same manner as that described above.

The results shown in Table 3 below were obtained.

TABLE 3

| | Phosphor Packing rate | Amount of emitted light | Noise ($\times 10^{-2}$) | Durability against movement operations |
|---|---|---|---|---|
| Ex. 14 | 77 | 114 | 0.17 | ○ |
| Ex. 15 | 76 | 114 | 0.14 | ○ |
| Ex. 16 | 78 | 115 | 0.12 | ○ |
| Ex. 17 | 78 | 115 | 0.12 | ○ |
| Ex. 18 | 76 | 115 | 0.13 | ○ |

TABLE 3-continued

| | Phosphor Packing rate | Amount of emitted light | Noise ($\times 10^{-2}$) | Durability against movement operations |
|---|---|---|---|---|
| Ex. 19 | 76 | 114 | 0.14 | ○ |
| Ex. 20 | 75 | 114 | 0.15 | ○ |
| Comp. Ex. 4 | 71 | 100 | 0.28 | Δ |

The amount of emitted light was expressed with the relative value with the amount of light, which was emitted by the radiation image storage panel of Comparative Example 4, being taken as 100.

As clear from Table 3, the third radiation image storage panel in accordance with the present invention has a higher phosphor packing rate, and yields a larger amount of emitted light and less graininess noise than with the radiation image storage panel of Comparative Example 4, in which the aralkyl phosphonic acid was not utilized. Also, the third radiation image storage panel in accordance with the present invention has good durability against movement operations.

As described above, with the third radiation image storage panel in accordance with the present invention, wherein the phosphor layer contains the aralkyl phosphonic acid, the dispersibility of the stimulable phosphor is capable of being enhanced, and the phosphor packing rate is capable of being enhanced such that the sensitivity may not be adversely affected by the compression processing. Therefore, an image having good image quality with little noise is capable of being formed. Also, the third radiation image storage panel in accordance with the present invention has good moisture resistance and enhanced durability against movement operations.

What is claimed is:

1. A radiation image storage panel, comprising at least a substrate and a phosphor layer overlaid upon the substrate, wherein the phosphor layer contains a binder, a phosphor, and at least one kind of organic phosphorus compound represented by Formula (1):

$$(R)_n PO(OM)_{3-n} \tag{1}$$

in which R represents an alkyl group, an aryl group, or a heterocyclic group, which may be optionally substituted by a substituent;

M represents a hydrogen atom, an alkali metal, or —N$^+$(R$^1$)$_4$, where R$^1$ represents an alkyl group having at most two carbon atoms; and n represents an integral number of 1 or 2.

2. A radiation image storage panel as defined in claim 1 wherein R in Formula (1) representing the organic phosphorus compound represents an aryl group or an aryl group substituted by an alkyl group having one to four carbon atoms.

3. A radiation image storage panel as defined in claim 1 or 2 wherein the binder is a thermoplastic elastomer having a softening temperature or a melting temperature, which falls within the range of 30° C. to 150° C.

4. A radiation image storage panel as defined in claim 3 wherein the binder is a polyurethane resin.

5. A process for producing a radiation image storage panel, which radiation image storage panel comprises at least a substrate and a phosphor layer overlaid upon the substrate, the phosphor layer containing a binder, a phosphor, and at least one kind of organic phosphorus compound represented by Formula (1):

$$(R)_n PO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting the phosphor, the organic phosphorus compound, and the binder to dispersing processing in order to prepare a coating composition, and ii) performing application of the coating composition in order to form the phosphor layer.

6. A process for producing a radiation image storage panel, which radiation image storage panel comprises at least a substrate and a phosphor layer overlaid upon the substrate, the phosphor layer containing a binder, a phosphor, and at least one kind of organic phosphorus compound represented by Formula (1):

$$(R)_n PO(OM)_{3-n} \quad (1)$$

in which R represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting particles of the phosphor to surface treatment with the organic phosphorus compound, ii) subjecting the surface-treated phosphor particles and the binder to dispersing processing in order to prepare a coating composition, and iii) performing application of the coating composition in order to form the phosphor layer.

7. A process as defined in claim 5 or 6 wherein the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

8. A radiation image storage panel, comprising at least a substrate and a phosphor layer overlaid upon the substrate, wherein the phosphor layer contains a binder, a phosphor, and at least one kind of organic phosphorus compound represented by either one of Formula (2) and Formula (3):

(2)

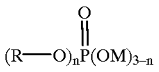

$$(R'—O)_n P(OM)_{3-n} \quad (3)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2.

9. A radiation image storage panel as defined in claim 8 wherein R' in each of Formula (2) and Formula (3) representing the organic phosphorus compound represents an aryl group.

10. A radiation image storage panel as defined in claim 8 or 9 wherein the binder is a thermoplastic elastomer having a softening temperature or a melting temperature, which falls within the range of 30° C. to 150° C.

11. A radiation image storage panel as defined in claim 10 wherein the binder is a polyurethane resin.

12. A process for producing a radiation image storage panel, which radiation image storage panel comprises at least a substrate and a phosphor layer overlaid upon the substrate, the phosphor layer containing a binder, a phosphor, and at least one kind of organic phosphorus compound represented by either one of Formula (2) and Formula (3):

(2)

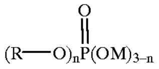

$$(R'—O)_n P(OM)_{3-n} \quad (3)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting the phosphor, the organic phosphorus compound, and the binder to dispersing processing in order to prepare a coating composition, and ii) performing application of the coating composition in order to form the phosphor layer.

13. A process for producing a radiation image storage panel, which radiation image storage panel comprises at least a substrate and a phosphor layer overlaid upon the substrate, the phosphor layer containing a binder, a phosphor, and at least one kind of organic phosphorus compound represented by either one of Formula (2) and Formula (3):

(2)

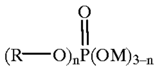

$$(R'—O)_n P(OM)_{3-n} \quad (3)$$

in which R' in Formula (2) represents an aryl group or a heterocyclic group;

R' in Formula (3) represents an alkyl group, an aryl group, or a heterocyclic group, which may be optionally substituted by a substituent;

M represents a hydrogen atom, an alkali metal, or $—N^+(R^1)_4$, where $R^1$ represents an alkyl group having at most two carbon atoms; and n represents an integral number of 1 or 2;

the process comprising the steps of:

i) subjecting particles of the phosphor to surface treatment with the organic phosphorus compound, ii) subjecting the surface-treated phosphor particles and the binder to dispersing processing in order to prepare a coating composition, and iii) performing application of the coating composition in order to form the phosphor layer.

14. A process as defined in claim 12 or 13 wherein the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

15. A radiation image storage panel, comprising at least a substrate and a phosphor layer overlaid upon the substrate, wherein the phosphor layer contains a binder, a phosphor, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms.

16. A radiation image storage panel as defined in claim 15 wherein the binder is a thermoplastic elastomer having a softening temperature or a melting temperature, which falls within the range of 30° C. to 150° C.

17. A radiation image storage panel as defined in claim 16 wherein the binder is a polyurethane resin.

18. A process for producing a radiation image storage panel, which radiation image storage panel comprises at least a substrate and a phosphor layer overlaid upon the substrate, the phosphor layer containing a binder, a phosphor, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$ represents an alkyl group having at most two carbon atoms;

the process comprising the steps of:

i) subjecting the phosphor, the aralkyl phosphonic acid, and the binder to dispersing processing in order to prepare a coating composition, and ii) performing application of the coating composition in order to form the phosphor layer.

19. A process for producing a radiation image storage panel, which radiation image storage panel comprises at least a substrate and a phosphor layer overlaid upon the substrate, the phosphor layer containing a binder, a phosphor, and at least one kind of aralkyl phosphonic acid represented by Formula (4):

$$((Ar)_m—R''—)_nPO(OM')_{3-n} \quad (4)$$

in which Ar represents an aryl group;

R" represents an aliphatic group having one to six carbon atoms;

m represents an integral number of at least 1;

n represents an integral number of 1 or 2; and

M' represents a hydrogen atom, an alkali metal, or $—N^+(R^3)_4$, where $R^3$represents an alkyl group having at most two carbon atoms;

the process comprising the steps of:

i) subjecting particles of the phosphor to surface treatment with the aralkyl phosphonic acid, ii) subjecting the surface-treated phosphor particles and the binder to dispersing processing in order to prepare a coating composition, and iii) performing application of the coating composition in order to form the phosphor layer.

20. A process as defined in claim 18 or 19 wherein the phosphor layer, which has been formed with the dispersing processing and the application of the coating composition, is located on the substrate, and the phosphor layer having been located on the substrate is compressed at a temperature equal to at least a softening temperature or a melting temperature of the binder, the phosphor layer and the substrate being thereby adhered to each other.

* * * * *